US007244007B2

(12) United States Patent
Ishizaki

(10) Patent No.: US 7,244,007 B2
(45) Date of Patent: Jul. 17, 2007

(54) CAPACITIVE LOAD DRIVING CIRCUIT, DROPLET EJECTION DEVICE, DROPLET EJECTION UNIT AND INKJET HEAD DRIVING CIRCUIT

(75) Inventor: Sunao Ishizaki, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 267 days.

(21) Appl. No.: 11/109,255

(22) Filed: Apr. 19, 2005

(65) Prior Publication Data

US 2005/0231179 A1 Oct. 20, 2005

(30) Foreign Application Priority Data

Apr. 20, 2004 (JP) ............................ 2004-124400
Apr. 12, 2005 (JP) ............................ 2005-114953

(51) Int. Cl.
*B41J 29/38* (2006.01)
*G05F 1/40* (2006.01)
*H02J 1/00* (2006.01)

(52) U.S. Cl. .............................. 347/5; 347/9; 323/268

(58) Field of Classification Search ................ 323/234, 323/266, 268, 270, 271, 273, 275, 282, 283; 347/5, 9–11, 14, 50, 54
See application file for complete search history.

(56) References Cited

U.S. PATENT DOCUMENTS 3,868,698 A * 2/1975 Dressler ...................... 347/75
5,631,675 A * 5/1997 Futagawa .................... 347/10
6,609,781 B2 * 8/2003 Adkins et al. ................ 347/37
6,929,340 B2 * 8/2005 Ishizaki ......................... 347/5

FOREIGN PATENT DOCUMENTS

JP 11-020203 1/1999
JP 2000-117980 4/2000

* cited by examiner

*Primary Examiner*—Matthew V. Nguyen
(74) *Attorney, Agent, or Firm*—Fildes & Outland, P.C.

(57) ABSTRACT

A capacitive load driving circuit which includes an operational amplifier, a pulse width modulator, a digital power amplifier, a first filter, a first feedback circuit and a second feedback circuit. The operational amplifier outputs a differential signal between a signal fed back to the inverting input terminal and an input signal inputted to the non-inverting input terminal. The pulse width modulator pulse width-modulates output from the operational amplifier and outputs a digital signal. The digital power amplifier amplifies power of the digital signal. The first filter smooths output of the digital power amplifier and inputs the smoothed signal to the capacitive load as the driving signal. The first feedback circuit feeds back the driving signal outputted from the first filter to the inverting input terminal of the operational amplifier. The second feedback circuit feeds back a signal outputted from the digital power amplifier, which signal includes a phase which is advanced relative to the driving signal, to the inverting input terminal of the operational amplifier.

22 Claims, 7 Drawing Sheets

CAPACITIVE LOAD DRIVING CIRCUIT, DROPLET EJECTION DEVICE, DROPLET EJECTION UNIT AND INKJET HEAD DRIVING CIRCUIT

CROSS-REFERENCE TO RELATED APPLICATION

This application claims priority under 35 USC 119 from Japanese Patent Application Nos. 2004-124400 and 2005-114953, the disclosures of which are incorporated by reference herein.

BACKGROUND OF THE INVENTION

1. Field of the Invention

The present invention relates to a capacitive load driving circuit, a droplet ejection device, a droplet ejection unit and an inkjet head driving circuit, and more particularly relates to a capacitive load driving circuit, droplet ejection device, droplet ejection unit and inkjet head driving circuit for driving capacitive loads.

2. Description of the Related Art

Heretofore, inkjet head driving circuits have caused ink droplets to be ejected from nozzles of inkjet heads, which nozzles are provided in correspondence with piezoelectric actuators, by outputting analog driving signals to the piezoelectric actuators so as to discharge the ink droplets from the nozzles. In such an inkjet head driving circuit, an analog amplification circuit is employed, and an analog driving signal which has been power-amplified by the analog amplification circuit is outputted to the piezoelectric actuators. However, analog amplification circuits have a drawback in that power supply efficiency is poor and they tend to generate heat during power amplification. Consequently, when a number of piezoelectric actuators are driven at the same time, a lot of heat is generated and there is a risk of heat damage to the driving circuit itself.

Further, it has been necessary to additionally mount radiators at inkjet head driving circuits in order to dissipate the heat generated by the analog amplification circuits.

Further yet, because piezoelectric actuators are capacitive elements, there is a problem in that when the number of piezoelectric actuators that are being driven at the same time is large, the waveform of a driving signal being inputted to the piezoelectric actuators is degraded, and when the number of piezoelectric actuators being driven at the same time is small, there is a lot of ringing in the waveform of the driving signal.

As a technology for solving these problems, a technique of correcting a voltage of a driving signal at an inkjet head driving circuit in accordance with an environmental temperature of an inkjet printer has been disclosed (see, for example, Japanese Patent Application Laid-Open (JP-A) No. 11-20203). According to the technology of JP-A No. 11-20203, the voltage of an analog driving signal outputted from a driving circuit is corrected such that the voltage is lower when the environmental temperature is higher and the voltage is higher when the environmental temperature is lower. In addition, a structure thereof employs a thermistor which has a characteristic of resistance falling when environmental temperature rises, so as to prevent thermal runaway of the driving circuit. As a result, a danger of thermal damage to the driving circuit can be avoided.

Further, in a technology of JP-A No. 2000-117980 relating to inkjet head analog amplification circuits, rather than bipolar transistors, MOSFETs are used as transistors included in the analog amplification circuits. Thus, the danger of thermal damage to the driving circuits due to heat generation is avoided.

JP-A No. 2000-117980 also discloses a technique for generating analog driving signals to drive piezoelectric actuators with large load capacitances without malfunctioning. In this technology of JP-A No. 2000-117980, negative feedback is applied to terminal voltages of the piezoelectric actuators in order to maintain terminal voltages of the piezoelectric actuator at a predetermined bias voltage. As a result, it is possible to compensate for degradation of the waveform of the analog driving signal that is inputted to the piezoelectric actuators.

With the conventional technologies described above, it is possible to avoid the risk of thermal damage to a driving circuit and to compensate for degradation of a waveform of an analog driving signal. However, none of the related technologies described above suppresses heating of the driving circuit itself. Therefore, it is still necessary to mount a radiator in order to dissipate heat generated in an analog amplification circuit.

Now, D-class amplification circuits which use pulse width modulation are known as amplification circuits in which power supply efficiency is good and heat generation temperatures are low. Whereas analog amplification circuits are of types which utilize linear amplification operations of transistors and the like, D-class amplification circuits are circuits which perform amplification by using digital techniques, meaning switching operations, utilizing variations in average output provided by ratios of on and off states of power sources. More specifically, at a D-class amplification circuit, input signals are pulse width-modulated to digital signals, power amplification is performed on the digital signals, the digital signals are demodulated back to analog driving signals after power amplification, and the analog driving signals are outputted. Thus, it is possible to perform amplification more efficiently than with an analog amplification circuit, and power consumption and heat generation are lower. Hence, in recent years, D-class amplification circuits have been particularly employed in audio circuits.

Employing such a D-class amplification circuit in place of an analog amplification circuit in an inkjet printer driving circuit has been considered as a method for suppressing the generation of heat in the driving circuit. However, there are a number of problems with employing D-class amplification circuits in inkjet head driving circuits, and this has not yet been realized.

To be specific, the load of an audio circuit is a speaker, so the load can be regarded as a substantially resistive load, and there is little load variation. In contrast, a piezoelectric actuator is a capacitive load, and the load varies in accordance with the number of actuators being used at the same time, which is problematic.

Furthermore, because a D-class amplification circuit performs power amplification after an input signal has been converted to a digital signal, a low-pass filter (LPF) is provided in order to return the power-amplified signal to an analog signal. The low-pass filter is structured with an inductor and a capacitor. Therefore, when capacitive elements such as piezoelectric actuators are being driven, a cutoff frequency of the LPF will vary in accordance with load variations due to variations in the number of piezoelectric actuators being driven at one time, which is problematic.

Moreover, for audio signals, signals in a frequency range of up to 10 kHz, possibly 20 kHz, are used. However, the range of driving signals of piezoelectric actuators is 100s of kHz. Accordingly, a sampling frequency of 5 MHz to 10 MHz is necessary for application of a D-class amplification circuit to an inkjet head driving circuit, but it is difficult to perform rapid switching operations at these frequencies in a D-class amplification circuit.

Because of these problems, it has been difficult to apply D-class amplification circuits to inkjet head driving circuits.

SUMMARY OF THE INVENTION

The present invention has been devised in view of the above circumstances and provides a capacitive load driving circuit, a droplet ejection device, a droplet ejection unit and an inkjet head driving circuit.

An inkjet head driving circuit of a first aspect of the present invention is a driving circuit of an inkjet head which includes a piezoelectric actuator corresponding with a pressure generation chamber which is charged with ink to be ejected from a nozzle, the driving circuit causing an ink droplet to be ejected from the nozzle by applying a driving signal to the piezoelectric actuator for altering a capacity of the pressure generation chamber, and the inkjet head driving circuit including: an operational amplifier, which outputs a differential signal between a signal which is fed back to an inverting input terminal and an input signal which is inputted to a non-inverting input terminal; a pulse width modulator, which pulse width-modulates output of the operational amplifier and outputs a digital signal; a digital power amplifier, which amplifies power of the digital signal; a first filter, which smooths output of the digital power amplifier and inputs the smoothed signal to the piezoelectric actuator as the driving signal for causing an ink droplet to be ejected from the nozzle of the inkjet head; a first feedback circuit, which feeds back the driving signal outputted from the first filter to the inverting input terminal of the operational amplifier; and a second feedback circuit, which includes a second filter for smoothing output of the digital amplifier and which feeds back a signal smoothed by the second filter to the inverting input terminal of the operational amplifier.

The operational amplifier of the present invention outputs a differential signal between the signal that is fed back to the inverting input terminal and the input signal inputted at the non-inverting input terminal. The pulse width modulator pulse width-modulates the output from the operational amplifier and outputs a digital signal. Thus, a digital signal with a duty ratio corresponding to the differential signal outputted from the operational amplifier is outputted by the pulse width modulator. The digital signal outputted from the pulse width modulator is power-amplified by the digital power amplifier and is then smoothed by the first filter. The first filter is a filter for smoothing digital signals and can be structured by, for example, a low-pass filter. The digital signal that has been smoothed by the first filter is inputted to piezoelectric actuators to serve as the driving signal. The piezoelectric actuators, which are capacitive loads, cause ink droplets to be ejected from nozzles when the driving signal that has been power-amplified by the digital power amplifier is inputted to the actuators. Thus, the inkjet head driving circuit of the present invention pulse width-modulates an inputted analog electronic signal, performs power amplification on the obtained digital signal, and then smooths the digital signal and outputs the smoothed driving signal to the piezoelectric actuators.

The first feedback circuit feeds back the driving signal outputted from the first filter to the inverting input terminal of the operational amplifier. A degree of smoothing at the first filter that is caused by this feedback of the driving signal outputted from the first filter can suppress variations caused by effects from the piezoelectric actuators, which are a capacitive load.

Because the driving signal outputted from the first filter is fed back to the inverting input terminal of the operational amplifier by the first feedback circuit, variations in a degree of smoothing of the first filter can be suppressed However, when the driving signal smoothed by the first filter is fed back, there is a danger of the waveform of the driving signal inputted to the piezoelectric actuators becoming degraded, and there is a danger of operations of the inkjet head driving circuit becoming unstable. However, the second feedback circuit is provided with a second filter for smoothing the output of the digital amplifier. The second feedback circuit feeds back a signal smoothed by the second filter to the inverting input terminal of the operational amplifier. Thus, because the second filter is provided and the output of the digital amplifier that has been smoothed by the second filter is also fed back to the inverting input terminal of the operational amplifier, degradation of the waveform of the driving signal, which is caused by the driving signal smoothed by the first filter being fed back, can be compensated for. Accordingly, a reduction in stability of operations of the inkjet head driving circuit can be suppressed.

Thus, the inkjet head driving circuit of the present invention amplifies power of a digital signal which has been pulse width-modulated on the basis of an inputted analog signal and, in comparison with power amplification of an analog signal, heating of the inkjet head driving circuit can be suppressed.

Further, because the first feedback circuit feeds back the driving signal outputted from the first filter to the operational filter, variation of the cutoff frequency of the first filter can be suppressed. Further yet, because the output of the digital amplifier that has been smoothed by the second filter is also fed back to the inverting input terminal of the operational amplifier, a reduction in stability of operations of the inkjet head driving circuit resulting from the feedback of the signal smoothed by the first filter can be curbed.

A capacitive load driving circuit which is a second aspect of the present invention is a capacitive load driving circuit which applies a driving signal to a capacitive load for driving the capacitive load, the capacitive load driving circuit including: an operational amplifier, which outputs a differential signal between a signal which is fed back to an inverting input terminal and an input signal which is inputted to a non-inverting input terminal, a pulse width modulator, which pulse width-modulates output of the operational amplifier and outputs a digital signal; a digital power amplifier, which amplifies power of the digital signal; a first filter, which smooths output of the digital power amplifier and inputs the smoothed signal to the capacitive load as the driving signal; a first feedback circuit, which feeds back the driving signal outputted from the first filter to the inverting input terminal of the operational amplifier; and a second feedback circuit, which feeds back a signal outputted from the digital power amplifier, which signal includes a phase which is advanced relative to the driving signal, to the inverting input terminal of the operational amplifier. Herein, a capacitive load means a load whose electrical capacitance is changeable.

Because the first feedback circuit feeds back the driving signal outputted from the first filter to the operational amplifier, variations in a cutoff frequency of the first filter can be suppressed. However, this may cause degradation of the waveform of the driving signal, and there is a risk of reducing stability of operations of the capacitive load driving circuit.

Accordingly, the second feedback circuit feeds back the signal outputted from the digital power amplifier, which is a signal whose phase is advanced relative to the driving signal, to the inverting input terminal of the operational amplifier. As a result, the second feedback circuit can compensate for the degradation of the waveform of the driving signal that is caused by the driving signal being fed back to the operational amplifier. Thus, it is possible to curb a reduction in stability of operations of the capacitive load driving circuit.

A capacitive load driving circuit of a third aspect of the present invention is a capacitive load driving circuit for applying a driving signal to a capacitive load and driving the capacitive load, the driving circuit including: an operational amplifier, which outputs a differential signal between a signal which is fed back to an inverting input terminal and an input signal which is inputted to a non-inverting input terminal; a pulse width modulator, which pulse width-modulates output of the operational amplifier and outputs a digital signal; a digital power amplifier, which amplifies power of the digital signal; a first filter, which smooths output of the digital power amplifier and inputs the smoothed signal to the capacitive load as a driving signal; a second feedback circuit, which feeds back a signal outputted from the digital power amplifier to the inverting input terminal of the operational amplifier, phase of the signal being advanced relative to the driving signal; and a third feedback circuit, which feeds back the driving signal, which has been outputted from the first filter and propagated through wiring resistance between the first filter and the capacitive load, to the inverting input terminal of the operational amplifier.

This capacitive load driving circuit has a structure which includes the third feedback circuit and the second feedback circuit to serve as feedback circuits. The third feedback circuit feeds back a driving signal which has been outputted from the first filter and propagated through the wiring resistance between the first filter and the capacitive load to the operational amplifier. The second feedback circuit feeds back the signal whose phase is advanced relative to the driving signal, which is a signal outputted from the digital power amplifier, to the operational amplifier. With the third feedback circuit, even though a wiring resistance is included between the capacitive load and the first filter, it is possible to inhibit degradation of the waveform of the driving signal that is outputted to the capacitive load, and it is possible to suppress variations in the cutoff frequency of the first filter. Further, the second feedback circuit can suppress a reduction in stability of operations of the capacitive load driving circuit due to the provision of the third feedback circuit.

Thus, even though the second feedback circuit and the third feedback circuit are included to serve as the feedback circuits of the capacitive load driving circuit, a loss of stability of operations of the capacitive load driving circuit can be curbed.

A capacitive load driving circuit which is a fourth aspect of the present invention is a capacitive load driving circuit which applies a driving signal to a capacitive load for driving the capacitive load, the capacitive load driving circuit including: an operational amplifier, which outputs a differential signal between a signal which is fed back to an inverting input terminal and an input signal which is inputted to a non-inverting input terminal; a pulse width modulator, which pulse width-modulates output of the operational amplifier and outputs a digital signal; a digital power amplifier, which amplifies power of the digital signal; a first filter, which smooths output of the digital power amplifier and inputs the smoothed signal to the capacitive load as the driving signal; a first feedback circuit, which feeds back the driving signal outputted from the first filter to the inverting input terminal of the operational amplifier, and at least one of a second feedback circuit, which feeds back a signal outputted from the digital power amplifier, which signal includes a phase which is advanced relative to the driving signal, to the inverting input terminal of the operational amplifier and a third feedback circuit, which feeds back the driving signal, which has been outputted from the first filter and propagated through wiring resistance between the first filter and the capacitive load, to the inverting input terminal of the operational amplifier.

Accordingly, with the capacitive load driving circuit described above, even when a driving signal which has been outputted from the first filter and degraded by the capacitive load is fed back to the operational amplifier by the first feedback circuit, this degradation is compensated for by one or both of the second and third feedback circuits, and thus a reduction in stability of operations can be curbed.

BRIEF DESCRIPTION OF THE DRAWINGS

Preferred embodiments of the present invention will be described in detail based on the following figures, wherein.

DETAILED DESCRIPTION OF THE INVENTION

Herebelow, embodiments of the present invention will be described in detail with reference to the drawings. For first to fourth embodiments, examples of inkjet head driving circuits which drive inkjet heads will be described. Each inkjet head is provided with a plurality of pressure generation chambers, which are charged with ink to be ejected through nozzles, and a plurality of piezoelectric actuators, which are provided in respective correspondence with the pressure generation chambers. The inkjet head driving circuit causes the inkjet head to eject ink droplets from the nozzles by applying a driving signal to the piezoelectric actuators to alter capacities of the pressure generation chambers.

FIRST EMBODIMENT

Figure 1:
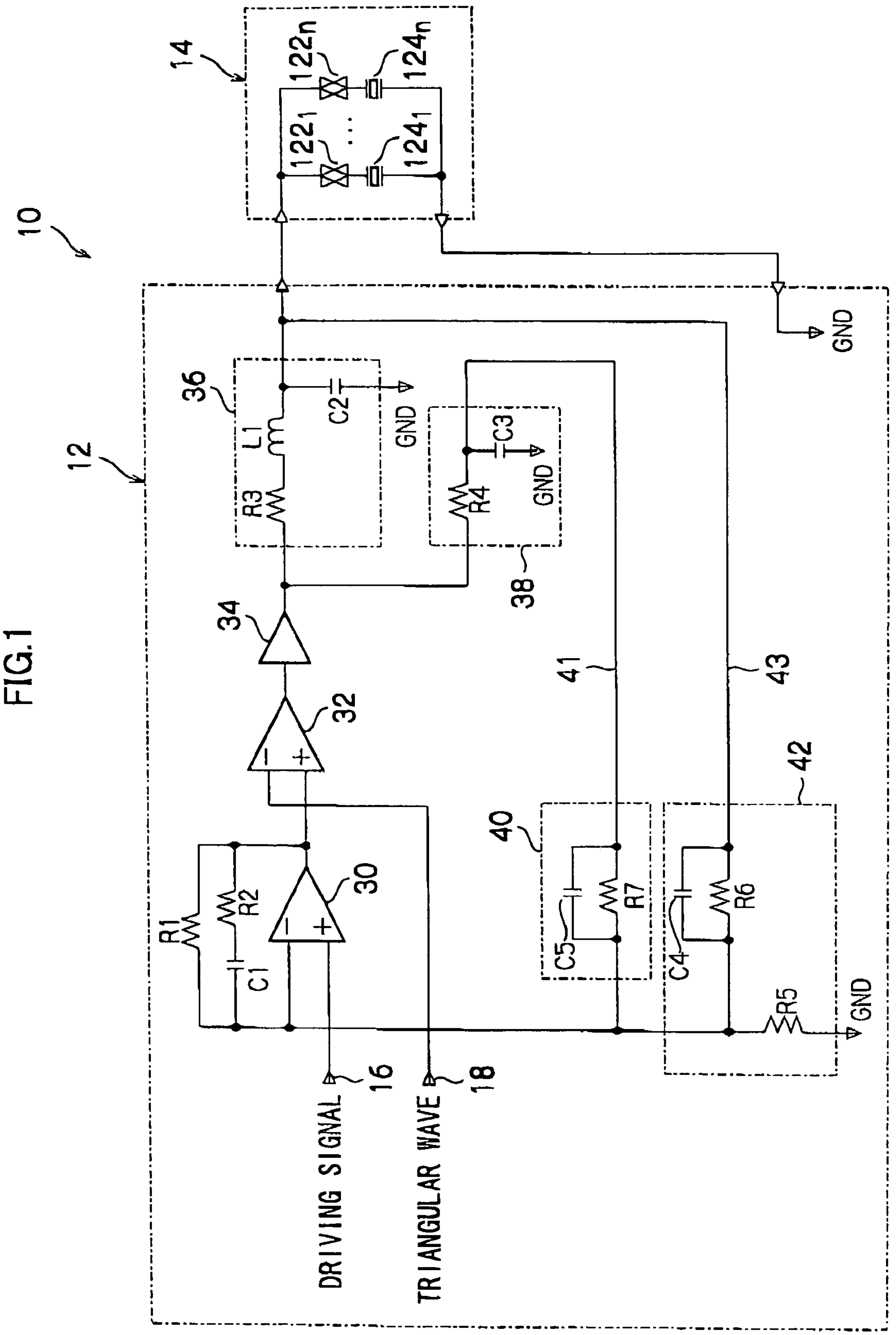
FIG. 1 is an inkjet head driving circuit relating to a first embodiment of the present invention.

As shown in FIG. 1, an inkjet head driving circuit 10 of the present embodiment is structured with a driving circuit board 12 and a head 14. At the driving circuit board 12, an operational amplifier 30, a comparator 32, a digital power amplifier 34, a first filter 36, a second filter 38, a smoothing circuit 42 and a smoothing circuit 40 are formed. At the head 14, n ('n' being a natural number) transfer gates $\mathbf{122}_1$ to $\mathbf{122}_n$ and n piezoelectric actuators $\mathbf{124}_1$ to $\mathbf{124}_n$, which are connected in respective series with the transfer gates $\mathbf{122}_1$ to $\mathbf{122}_n$, are provided.

A driving signal input terminal 16, at which an input signal is inputted, is connected to a non-inverting input terminal of the operational amplifier 30. An output terminal of the operational amplifier 30 is connected to a non-inverting input terminal of the comparator 32, which constitutes a pulse width modulator. The output terminal of the operational amplifier 30 is also connected to an inverting input terminal of the operational amplifier 30, via a series circuit structured by a resistor R2 and a capacitor C1. A resistor R1 is connected in parallel with the series circuit structured by the resistor R2 and capacitor C1.

An inverting input terminal of the comparator 32 constituting the pulse width modulator is connected to a triangular wave input terminal 18, at which a triangular wave is inputted. An output terminal of the comparator 32 is connected to an input terminal of the digital power amplifier 34.

Figure 2:
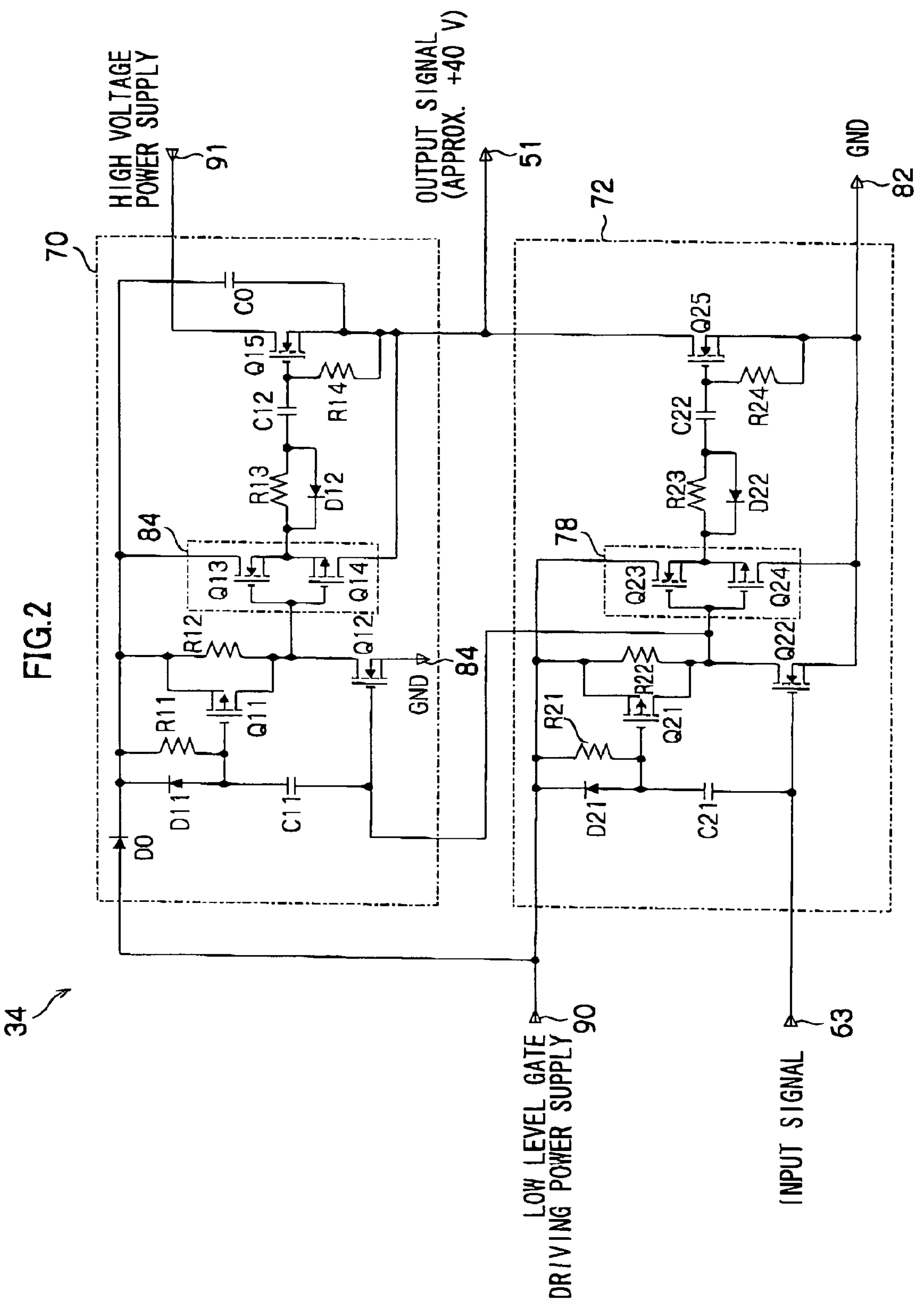
FIG. 2 is a digital power amplifier relating to the first embodiment of the present invention.

As shown in FIG. 2, the digital power amplifier 34 has a structure which includes an upper side switching circuit 70 and a lower side switching circuit 72. The upper side switching circuit 70 is a structure which includes a capacitor C11, a diode D11, a resistor R11, a MOSFET Q11, a resistor R12, a MOSFET Q12, a MOSFET Q13, a MOSFET Q14, a resistor R13, a diode D12, a capacitor C12, a resistor R14 and a MOSFET Q15.

The lower side switching circuit 72 is a structure which includes a capacitor C21, a diode D21, a resistor R21, a MOSFET Q21, a resistor R22, a MOSFET Q22, a MOSFET Q23, a MOSFET Q24, a resistor R23, a diode D22, a capacitor C22, a resistor R24 and a MOSFET Q25.

An input terminal 63, which is connected to the output terminal of the comparator 32, is connected to the gate of the N-channel MOSFET (field effect transistor) Q22. The source of the MOSFET Q22 is connected to a ground 82, which is connected to ground. The drain of the MOSFET Q22 is connected, via the resistor R22, to a driving power supply connection terminal 90, which is connected to a driving power source for driving the lower side switching circuit 72. A terminal of the resistor R22 at the side thereof of the driving power supply connection terminal 90 is connected to the drain of the MOSFET Q21, which is structured by a MOSFET. A terminal at the MOSFET Q22 side of the resistor R22 is connected to the source of the MOSFET Q21. The gate of the MOSFET Q21 is connected to the anode of the diode D21. The cathode of the diode D21 is connected to the driving power supply connection terminal 90. The gate of the MOSFET Q21 is also connected, via the resistor R21, to the driving power supply connection terminal 90. The gate of the MOSFET Q21 is further connected, via the capacitor C21, to the input terminal 63.

The capacitor C21, the diode D21, the resistor R21, the MOSFET Q21, the resistor R22 and the MOSFET Q22 function as a lower side voltage amplification circuit of the present invention.

The driving power supply connection terminal 90 is connected, via the resistor R22, to an input terminal of a push-pull type buffer circuit 78. This buffer circuit 78 is structured by the MOSFET Q23 and the MOSFET Q24, whose gate terminals are connected to one another. The drain of the MOSFET Q23 is connected to the driving power supply connection terminal 90, and the source of the MOSFET Q23 is connected to the drain of the of the MOSFET Q24. The source of the MOSFET Q24 is connected to the ground 82. An output terminal of the buffer circuit 78 is connected, via the resistor R23 and the capacitor C22, to the gate of the N-channel MOSFET Q25. The source of the MOSFET Q25 is connected to the ground 82, and the drain is connected to an output terminal 51 of the digital power amplifier 34. A resistor R24 is connected between the gate and the source of the MOSFET Q25. The anode of the diode D22 is connected, via the capacitor C22, to the gate of the MOSFET Q25. The cathode of the diode D22 is connected to the output terminal of the buffer circuit 78.

The MOSFET Q23, the MOSFET Q24, the resistor R23, the diode D22, the capacitor C22 and the resistor R24 function as a lower side current amplification circuit of the present invention. The MOSFET Q25 functions as a lower side switching element of the present invention.

The upper side switching circuit 70 is structured with connections substantially the same as the connections of the elements that structure the lower side switching circuit 72. Accordingly, a detailed description of the upper side switching circuit 70 is not provided, and only connections that differ from the elements structuring the lower side switching circuit 72 will be described.

The capacitor C11, the diode D11, the resistor R11, the MOSFET Q11, the resistor R12, the MOSFET Q12, the MOSFET Q13, the MOSFET Q14, the resistor R13, the diode D12, the capacitor C12, the resistor R14 and the MOSFET Q15 of the upper side switching circuit 70 correspond, respectively, to the capacitor C21, the diode D21, the resistor R21, the MOSFET Q21, the resistor R22, the MOSFET Q22, the MOSFET Q23, the MOSFET Q24, the resistor R23, the diode D22, the capacitor C22, the resistor R24 and the MOSFET Q25 of the lower side switching circuit 72. A buffer circuit 84 corresponds to the buffer circuit 78.

The gate of the MOSFET Q12 is connected, via the source and drain of the MOSFET Q22 of the lower side switching circuit 72, to the ground 82. The source of the MOSFET Q12 is connected to a ground 84. The source of the MOSFET Q15 is connected to the output terminal 51. The drain of the MOSFET Q15 is connected to a terminal 91 of a high voltage side power source for amplifying current. The anode of a diode D0 is connected to the driving power supply connection terminal 90, and the cathode of the diode D0 is connected, via the capacitor C0, to the source of the MOSFET Q15. One terminal of the resistor R14 is connected to the gate of the MOSFET Q15, and the other terminal of the resistor R14 is connected to the source of the MOSFET Q15.

The capacitor C11, the diode D11, the resistor R11, the MOSFET Q11, the resistor R12 and the MOSFET Q12 function as an upper side voltage amplification circuit of the present invention. The MOSFET Q13, the MOSFET Q14, the resistor R13, the diode D12, the capacitor C12 and the resistor R14 function as an upper side current amplification circuit of the present invention. The MOSFET Q15 functions as an upper side switching element of the present invention. The MOSFET Q13 and the MOSFET Q14 function as a push-pull type upper side buffer circuit of the present invention.

As shown in FIG. 1, the output terminal of the digital power amplifier 34 is connected to input terminals of the first filter 36 and the second filter 38. The first filter 36 is structured by a resistor R3, an inductor L1 and a capacitor C2, and constitutes a low-pass filter. The second filter 38 is structured by a resistor R4 and a capacitor C3, and constitutes a low-pass filter. Thus, the first filter 36 is provided with two elements for attenuating a high frequency region—a circuit formed by the resistor R3 and the capacitor C2, and the inductor L1. In other words, the first filter 36 is provided with a second order delay element. The second filter 38 is provided with a single element for attenuating a high frequency region—the circuit formed of the resistor R4 and the capacitor C3. In other words, the first filter 36 is provided with a first order delay element. Consequently, the second filter 38 is a low-pass filter with a lesser degree of smoothing than the first filter 36.

An output terminal of the first filter 36 is connected to the transfer gates $\mathbf{122}_1$ to $\mathbf{122}_n$ of the head 14. The n piezoelectric actuators $\mathbf{124}_1$ to $\mathbf{124}_n$ are each connected to the corresponding transfer gate 122 of the n transfer gates $\mathbf{122}_1$ to $\mathbf{122}_n$.

The output terminal of the first filter 36 is connected, via a first feedback circuit 43, to the inverting input terminal of the operational amplifier 30. The first feedback circuit 43 includes the smoothing circuit 42, which is structured by a resistor R6 and a capacitor C4, which is connected in parallel with the resistor R6.

The output terminal of the digital power amplifier 34 is connected, via a second feedback circuit 41, to the inverting input terminal of the operational amplifier 30. The second feedback circuit 41 includes the smoothing circuit 40, which is structured by a resistor R7 and a capacitor C5, which is connected in parallel with the resistor R7.

Next, operation of the inkjet head driving circuit 10 will be described.

As shown in FIG. 1, the operational amplifier 30 outputs a differential signal between the input signal, which is inputted through the driving signal input terminal 16 to the non-inverting input terminal, and a driving signal, which is fed back by the smoothing circuit 40, the smoothing circuit 42, the first feedback circuit 43 and the second feedback circuit 41, to the non-inverting input terminal of the comparator 32.

The comparator 32 is a circuit for performing pulse width modulation. The comparator 32 performs pulse width modulation on the basis of the differential signal inputted at the non-inverting input terminal thereof and the triangular wave inputted at the inverting input terminal, and outputs a digital signal to the digital power amplifier 34. The comparator 32 outputs a high level signal when the voltage of the differential signal inputted at the non-inverting input terminal is higher than the voltage of the triangular wave inputted at the inverting input terminal, and outputs a low level signal when the differential signal voltage is lower than the triangular wave voltage. Thus, the comparator 32 outputs a digital signal with duty ratios corresponding to changes in the voltage of the differential signal inputted at the non-inverting input terminal so that the voltage of the differential signal tends to zero.

The digital power amplifier 34 voltage-amplifies and current-amplifies the digital signal, which is inputted thereto from the comparator 32 via the input terminal 63, up to an electrical power capable of driving the piezoelectric actuators 124 (for example, a voltage from approximately 20 V to 40 V) by switching operations, and outputs the amplified signal.

The first filter 36 smooths the output from the digital power amplifier 34, and outputs the smoothed signal to the respective transfer gates $\mathbf{122}_1$ to $\mathbf{122}_n$ of the head 14.

Herein, an image memory and a data transmission circuit are provided at the driving circuit board 12. The image memory stores color image data of a portion corresponding to one line that is to be printed at a serial printer. The data transmission circuit converts the color image data to serial data and transmits the serial data to the head 14. A data-receiving circuit and a level-shift circuit are provided at the head 14. The data-receiving circuit receives the serial data and converts the serial data to parallel data. The level-shift circuit shifts the transfer gates $\mathbf{122}_1$ to $\mathbf{122}_n$ to voltages at which operation thereof is possible.

When the power-amplified driving signal is inputted from the driving circuit board 12 to the respective transfer gates $\mathbf{122}_1$ to $\mathbf{122}_n$ and voltages corresponding to image data are respectively applied from the level-shift circuit to the transfer gates $\mathbf{122}_1$ to $\mathbf{122}_n$, driving voltage is applied to those of the respective piezoelectric actuators $\mathbf{124}_1$ to $\mathbf{124}_n$ that are connected in correspondence with the transfer gates $\mathbf{122}_1$ to $\mathbf{122}_n$ to which printing voltage is applied by the level-shift circuit.

Because the piezoelectric actuators $\mathbf{124}_1$ to $\mathbf{124}_n$ are capacitive loads, there is a risk of the cutoff frequency of the first filter 36 varying in response to changes in the number of the piezoelectric actuators $\mathbf{124}_1$ to $\mathbf{124}_n$ are that operating at one time in accordance with the image data. More specifically, the capacitor C2 structuring the first filter 36 and the piezoelectric actuators $\mathbf{124}_1$ to $\mathbf{124}_n$ which are capacitive loads are in parallel. Therefore, when the number of the piezoelectric actuators $\mathbf{124}_1$ to $\mathbf{124}_n$ that are operating at the same time changes, the load on the first filter 36 changes, and the cutoff frequency changes.

However, in the present embodiment, the output terminal of the first filter 36 is connected to the inverting input terminal of the operational amplifier 30 via the first feedback circuit 43. Thus, it is possible to perform negative feedback of the driving signal outputted from the first filter 36. Therefore, it is possible to suppress variations in the cutoff frequency of the first filter 36. Further, by suppressing variations in the cutoff frequency of the first filter 36, it is possible to correct the terminal voltages of the piezoelectric actuators $\mathbf{124}_1$ to $\mathbf{124}_n$ so as to be substantially constant.

The output terminal of the first filter 36 which includes a second order delay element is connected, via the first feedback circuit 43, to the inverting input terminal of the operational amplifier 30. Thus, the driving signal outputted from the first filter 36 is negatively fed back. In consequence, there is a high risk of delays in phases of the high frequency region occurring and of oscillations being induced. Hence, a problem of operations of the inkjet head driving circuit 10 becoming unstable arises.

However, in the present embodiment, the second filter 38 is provided at the output terminal of the digital power amplifier 34 and the output terminal of the digital power amplifier 34 is connected, via the second feedback circuit 41, to the inverting input terminal of the operational amplifier 30. Therefore, the output of the digital power amplifier 34 can be negatively fed back to the input terminal of the second filter 38 before being inputted to the first filter 36. Because the second filter 38 is provided with a first order delay element, the second filter 38 operates, with respect to the first filter 36, so as to advance phases of a high frequency region. Because the smoothing circuit 40 feeds back output of the second filter 38 to the inverting input terminal of the operational amplifier 30 in this manner, it is possible to correct for delays of high frequency region phases, which are caused by the negative feedback of the driving signal outputted from the first filter 36, and greater stability of operations of the inkjet bead driving circuit 10 can be expected.

The operating voltage at the comparator 32 is fixed in advance. Hence, when a signal with a voltage exceeding this operating voltage is inputted, there is a risk of overflow. However, in the present embodiment, the differential signal outputted from the operational amplifier 30 is inputted to the inverting input terminal of the operational amplifier 30 via the series circuit structured by the resistor R2 and the capacitor C1, and via the resistor R1 which is connected in parallel with this series circuit.

Accordingly, it is possible to limit gain of the operational amplifier 30 such that the voltage of the differential signal outputted from the operational amplifier 30 will not exceed the pre-specified operational voltage of the comparator 32. Therefore, it is possible to inhibit overflow of the comparator 32.

Furthermore, because the capacitor C1 is provided, even if a grounded-emitter circuit is used at the operational amplifier 30, which would cause a deterioration in high-frequency characteristics, it is possible to curb a deterioration of high frequency characteristics of the operational amplifier 30.

Next, operation of the digital power amplifier 34 will be described in detail.

It is known that driving signals for driving the respective piezoelectric actuators $\mathbf{124}_1$ to $\mathbf{124}_n$ are signals in a frequency range of 100 kHz to 1 MHz. Accordingly, in order to perform switching operations at such frequencies in the digital power amplifier 34, a sampling frequency of around 10 MHz is required. Therefore, at the digital power amplifier 34, it is necessary for high-speed switching operations in the order of 10 nanoseconds to be performed.

When the digital signal inputted through the input terminal 63 from the comparator 32 is at the high level, at the MOSFET Q22 of the lower side switching circuit 72, the gate voltage is higher than the source voltage, and the MOSFET Q22 is on. At such a time, the drain voltage of the MOSFET Q22 and the source voltage of the MOSFET Q25 are substantially the same. Therefore, the MOSFET Q25 is off.

Further, because the MOSFET Q22 of the lower side switching circuit 72 is on when the digital signal inputted through the input terminal 63 is at the high level, the grounding of the ground 82, which is to say a low level voltage, is inputted to the gate of the MOSFET Q12 of the upper side switching circuit 70. Because the source of the MOSFET Q12 is connected to ground, the MOSFET Q12 is off. When the MOSFET Q12 is off, the power supply voltage is inputted, through the driving power supply connection terminal 90, to the source of the MOSFET Q15. When there is no charge at all stored at the capacitor C0, the gate voltage of the MOSFET Q15 is higher than the source voltage of the MOSFET Q15, and the MOSFET Q15 is on.

Therefore, when the digital signal inputted through the input terminal 63 is at the high level, the MOSFET Q15 of the upper side switching circuit 70 is on and the MOSFET Q25 of the lower side switching circuit 72 is off. Thus, the upper side switching circuit 70 is in a conducting state. At this time, because the MOSFET Q25 is off, the lower side switching circuit 72 is in an open state. Thus, when the digital signal inputted at the input terminal 63 is at the high level, the digital power amplifier 34 acts as a positive logic power amplification circuit overall, and the upper side switching circuit 70 charges each of the piezoelectric actuators $\mathbf{124}_1$ to $\mathbf{124}_n$.

In contrast, when the digital signal inputted through the input terminal 63 is at the low level, the MOSFET Q15 of the upper side switching circuit 70 is off, the MOSFET Q25 of the lower side switching circuit 72 is on, and the lower side switching circuit 72 is in the conducting state. Therefore, when the digital signal inputted at the input terminal 63 is at the low level, the digital power amplifier 34 acts as a negative logic power amplification circuit overall, and the lower side switching circuit 72 discharges each of the piezoelectric actuators $\mathbf{124}_1$ to $\mathbf{124}_n$.

In this manner, the digital power amplifier 34 uses digital techniques, meaning switching operations, to perform voltage amplification and current amplification. Therefore, in comparison with conventional power amplifiers for voltage amplification and current amplification of analog signals, the generation of heat during power amplification can be suppressed.

The series circuit structured by the MOSFET Q12 and the resistor R12 of the upper side switching circuit 70 is a circuit for amplifying voltage of the digital signal, and performs voltage amplification in accordance with the digital signal inputted through the input terminal 63.

When the digital signal inputted through the input terminal 63 is at the high level, the MOSFET Q12 is off. When the MOSFET Q12 is off, the power supply voltage is inputted through the driving power supply connection terminal 90 via the resistor R12, and power amplification is implemented by the series circuit structured by the resistor R12 and the MOSFET Q12, subsequent to which the signal is outputted to the buffer circuit 84.

Now, when the digital signal inputted through the input terminal 63 changes from the low level to the high level, the MOSFET Q12 switches from on to off. In a transitional state in which the MOSFET Q12 is switching from on to off, the voltage from the driving power supply connection terminal 90 is applied, via the resistor R12, to a feedback capacitance between the gate and drain of the MOSFET Q12. Here, the feedback capacitance between the gate and drain of the MOSFET Q12 is of the order of several pF. Thus, for the MOSFET Q12 to operate at high speed, it is necessary to set the value of the resistor R12 to a small value, for example, 1 kΩ. However, in the transitional state in which the MOSFET Q12 is switching from on to off, there is a risk of generating a large amount of heat, of the order of 1 W, when current from the driving power supply connection terminal 90 flows through the resistor R12 to the feedback capacitance between the gate and drain of the MOSFET Q12.

In order to suppress such heating, it is necessary to make the value of the resistor R12 larger. However, if the value of the resistor R12 is made larger, it becomes difficult to operate the MOSFET Q12 at high speed.

Accordingly, in the present embodiment, the MOSFET Q11 is connected so as to turn on when the digital signal inputted through the input terminal 63 is at the low level and, when on, to bypass the resistor R12 with a short-circuit between the driving power supply connection terminal 90 and the drain of the MOSFET Q12. Hence, the value of the resistor R12 is set to a large value In the present embodiment, the resistor R12 is set to a value of, for example, 10 kΩ or more. Because the MOSFET Q11 is on when the digital signal inputted through the input terminal 63 is at the low level, the resistor R12 is shorted, and current from the driving power supply connection terminal 90 flows through the resistor R11 to the drain of the MOSFET Q12.

Thus, because the resistor R12 is set to a larger value and the MOSFET Q11, which turns on when the digital signal inputted through the input terminal 63 is at the low level, is provided so as to bypass the resistor R12, it is possible to implement a diversionary circuit which does not pass through the resistor R12 when the digital signal is at the low level. Hence, it is possible to inhibit heating and it is possible to operate the MOSFET Q12 at high speeds.

Now, when the resistance of the resistor R12 is made larger, it will be difficult to supply current to the MOSFET Q13 and the MOSFET Q14 if the MOSFET Q13 and MOSFET Q14 are structured by bipolar transistors. Therefore, in the present embodiment, the MOSFET Q13 and MOSFET Q14 are structured by P-channel MOSFETs.

When the digital signal inputted through the input terminal 63 is at the high level, a pinchoff voltage substantially matching the power supplied through the driving power supply connection terminal 90 is applied to the capacitor C11. When the digital signal inputted through the input terminal 63 switches to the low level, because the MOSFET Q12 is on, the gate voltage of the MOSFET Q11 falls in a short time. When the gate voltage of the MOSFET Q11 falls in a short time, a lower side terminal voltage of the capacitor C11 also falls. Thus, an input capacitance between the gate and source of the MOSFET Q12 is rapidly discharged. Therefore, even if the MOSFET Q11 is structured by a P-channel MOSFET, it is possible to operate the MOSFET Q11 at high speed.

Further, the anode of the diode D11 is connected to the capacitor C11, and the cathode of the diode D11 is connected to the driving power supply connection terminal 90. Because the diode D11 is connected thus, when the gate voltage of the MOSFET Q12 rises, application of a reverse bias to the driving power supply connection terminal 90 as a result of the rise in the gate voltage can be prevented.

Thus, in regard to the capacitor C11, diode D11, resistor R11, MOSFET Q11, resistor R12 and MOSFET Q12 which function as the upper side voltage amplification circuit of the present invention: the MOSFET Q12, which turns on when the digital signal inputted through the input terminal 63 is at the low level, and the resistor R12 are connected in series to structure a series circuit which functions as a voltage amplification circuit; the resistance of the resistor R12 is set to a value which is large; and the MOSFET Q11 is connected so as to bypass the resistor R12 by turning on when the digital signal is at the low level. Thus, heating of the series circuit can be avoided and the MOSFET Q12 can be operated quickly.

Because it is possible to discharge the gate-source capacitance of the MOSFET Q11 rapidly with the capacitor C11, it is possible to operate the MOSFET Q11 at high speeds. Further, with the diode D11, it is possible to prevent a reverse bias being applied to the driving power supply connection terminal 90.

Next, operations of the upper side switching circuit 70, respective operations of the MOSFET Q13, MOSFET Q14, resistor R13, diode D12, capacitor C12 and resistor R14, which function as a current amplification circuit of the present invention, and operations of the MOSFET Q15, which functions as an upper side switching element of the present invention, will be described.

As described above, when the digital signal inputted through the input terminal 63 is at the high level, the MOSFET Q12 turns off and voltage amplification is implemented by the series circuit structured by the resistor R12 and the MOSFET Q12. The voltage-amplified signal is outputted to the buffer circuit 84.

The buffer circuit 84, being a push-pull type buffer circuit formed by the MOSFET Q13 and the MOSFET Q14, current-amplifies the voltage-amplified signal. The voltage-amplified and current-amplified signal is outputted through the resistor R13 and the capacitor C12 to the gate of the MOSFET Q15. When the digital signal inputted through the input terminal 63 is at the high level, the MOSFET Q15 is on. Thus, the voltage-amplified and current-amplified signal is outputted through the output terminal 51. Hence, the upper side switching circuit 70 charges the respective piezoelectric actuators $\mathbf{124}_1$ to $\mathbf{124}_n$.

Here, the driving signal for driving the respective piezoelectric actuators $\mathbf{124}_1$ to $\mathbf{124}_n$ is known as being in the frequency range of 100s of kHz to 1 MHz. Therefore, it is necessary for the digital power amplifier 34 to realize high-speed switching of the order of 10 ns.

In the present embodiment, an N-channel MOSFET, operations of which are several times faster than with a P-channel MOSFET, is employed as the MOSFET Q15. Thus, it is possible to perform high-speed switching operations.

A MOSFET has an input capacitance between the gate and the source thereof. Therefore, to operate the MOSFET Q15 at high speeds, it is also necessary to implement charging and discharging of the input capacitance between the gate and source of the MOSFET Q15 rapidly.

In the present embodiment, the MOSFET Q13 and MOSFET Q14 which function as the current amplification circuit are structured as a push-pull type buffer circuit. This circuit constitutes a source follower and has a low output impedance. Therefore, it is possible to perform charging and discharging of the input capacitance between the gate and source of the MOSFET Q15 rapidly, and high-speed operations of the MOSFET Q15 can be realized.

In the present embodiment, the resistor R13 is connected between the push-pull type buffer circuit, which is structured by the MOSFET Q13 and the MOSFET Q14, and the MOSFET Q15. If charging and discharging of the input capacitance between the gate and source of the MOSFET Q15 is too fast, a large current will flow for a short time. Consequently, there will be a risk of noise being generated. However, the rate of current that flows between the buffer circuit 84 and the MOSFET Q15 can be suppressed by the resistor R13, so the speed of charging of the input capacitance between the gate and source of the MOSFET Q15 can be restrained, and the generation of noise can be suppressed.

Basically, the MOSFET Q15 of the upper side switching circuit 70 and the MOSFET Q25 of the lower side switching circuit 72 will not be on at the same time. However, when high-speed operations of the MOSFET Q15 are realized and high-speed operations of the MOSFET Q25 of the similarly structured lower side current amplification circuit of the lower side switching circuit 72 are realized, there is a risk that turn-on times and turn-off times of the MOSFET Q15 and the MOSFET Q25 may overlap. In a period in which a turn-on time and a turnoff time of the MOSFET Q15 and the MOSFET Q25 overlap, the upper side switching circuit 70 and the lower side switching circuit 72 are both in the conducting state at the same time. Consequently, there is a possibility not only of an erroneous operation occurring but of damage to the elements.

In the present embodiment, the diode D12 is connected so as to bypass the resistor R13 during discharge of the input capacitance between the gate and source of the MOSFET Q15. Therefore, because it is possible to quickly discharge the input capacitance of the MOSFET Q15, the turn-on time of the MOSFET Q15 can be slowed, and the turnoff time can be accelerated. Moreover, the capacitor C12 is connected between the resistor R13 and the MOSFET Q15. Because the capacitor C12 is connected between the resistor R13 and the MOSFET Q15, the input capacitance between the gate and source of the MOSFET Q15 and the capacitor C12 constitute a series circuit, the input capacitance between the gate and source of the MOSFET Q15 can be more rapidly discharged, and the turn-off time of the MOSFET Q15 can be accelerated.

Accordingly, because the MOSFET Q15 of the upper side current amplification circuit is structured by an N-channel MOSFET, it is possible to operate the MOSFET Q15 at high speed. Further, because the push-pull type buffer circuit 84 formed by the MOSFET Q13 and the MOSFET Q14 is provided in the upper side current amplification circuit, the input capacitance between the gate and source of the MOSFET Q15 can be charged and discharged rapidly. Furthermore, because the push-pull type buffer circuit 84 which functions as a current amplification circuit structured by the MOSFET Q13 and the MOSFET Q14 is connected in series with the MOSFET Q15, via the resistor R13 and the capacitor C12, and the diode D12 is provided so as to short out the resistor R13 during discharge of the input capacitance of the MOSFET Q15, a charging speed of the input capacitance of the MOSFET Q15 is restrained, and it is possible to slow the turn-on time and accelerate the turn-off time of the MOSFET Q15.

Thus, because it is possible to slow the turn-on times and accelerate the turn-off times of the MOSFET Q15 and the MOSFET Q25, it is possible to avoid the upper side switching circuit 70 and the lower side switching circuit 72 being in the conducting state at the same time.

The lower side switching circuit 72 has a similar structure to the upper side switching circuit 70. Therefore, the lower side switching circuit 72 can provide similar effects to the upper side switching circuit 70.

Further, because the MOSFET Q13 and MOSFET Q14 that constitute the push-pull type buffer circuit 84 are structured by MOSFETs, an input impedance, with respect to the resistor R12, of the series circuit structured by the resistor R12 and the MOSFET Q12, which functions as the voltage amplification circuit, can be raised. Thus, it is possible to curb a reduction in the amplification ratio.

Next, a bootstrap circuit which is structured by the diode D0 and the capacitor C0 from the driving power supply connection terminal 90 will be described.

The MOSFET Q15 which is provided in the upper side current amplification circuit of the upper side switching circuit 70 is structured by an N-channel MOSFET. Therefore, it is necessary for a power supply driving the gate of the MOSFET Q15 to be a power supply with a higher voltage than the source voltage. The terminal 91 of a high voltage power supply is connected to the drain of the MOSFET Q15. In the present embodiment, the voltage of the digital signal inputted through the input terminal 63 is 5 V, the voltage of the lower side gate driving power supply connection terminal 90 is 5 V, a voltage-amplified and current-amplified digital signal at 40 V is outputted through the output terminal 51, and the high voltage power supply through the terminal 91 is a 40 V voltage supply. In order to drive the MOSFET Q15 of an upper side current amplification circuit, it is necessary to prepare a driving power supply with a higher voltage than the source voltage of the MOSFET Q15 as a power supply for driving the MOSFET Q15 of the upper side current amplification circuit. For the present embodiment, a separate driving power supply of around 45 V is required. There is no technical difficulty in providing such a high-voltage driving power supply to serve as a gate-driving power supply of the upper side switching circuit 70 separately from the driving power supply. However, this is disadvantageous in regard to costs.

Accordingly, in the present embodiment, the driving power supply connection terminal 90 is connected through the diode D0 and the capacitor C0 to the source of the MOSFET Q15, to structure a bootstrap circuit. When the digital signal inputted through the input terminal 63 is at the low level, the MOSFET Q25 of the lower side switching circuit 72 is on and the MOSFET Q15 of the upper side switching circuit 70 is off. Thus, when the lower side switching circuit 72 is in the conducting state, a loop is formed from the driving power supply 90 through the diode D0 to the capacitor C0, and the capacitor C0 is charged up by the driving power supply 90.

When the digital signal inputted through the input terminal 63 switches from the low level to the high level, the MOSFET Q25 of the lower side switching circuit 72 turns from on to off, and the MOSFET Q15 of the upper side switching circuit 70 turns from off to on. When the MOSFET Q15 starts to switch on, the source voltage of the MOSFET Q15 rises, the charge that has been charged onto the capacitor C0 is applied to the MOSFET Q15, and the MOSFET Q15 enters a driving-capable state. When the MOSFET Q15 has completely switched on, because the capacitor C0 is in the charged state, a lower side terminal voltage of the capacitor C0 jumps up to around 45 V. Accordingly, all voltages of the upper side switching circuit 70 jump up to around 45 V during driving of the upper side switching circuit 70. When the MOSFET Q15 of the upper side current amplification circuit is completely switched on, the loop for charging of the capacitor C0, from the driving power supply 90 through the diode D0 to the capacitor C0, is eliminated, and a voltage-amplified and current-amplified high level (40 V) signal is outputted through the output terminal 51.

Now, if a PNP bipolar transistor is used at the MOSFET Q11, charge of the capacitor C11 will escape through the diode D11 in the forward direction between the base and emitter, and consequently a voltage drop will occur and operation of the upper side switching circuit 70 may become impossible. In the present embodiment however, because the MOSFET Q11 is structured by a MOSFET, this problem can be eliminated.

As described above, the diode D0 and the capacitor C0 function as a bootstrap circuit. Thus, there is no need to separately provide a dedicated gate-driving power supply for the upper side switching circuit 70, and the upper side switching circuit 70 can be driven by the lower side gate driving power supply 90 of the lower side switching circuit 72.

Here, for the present example, a case in which the lower side gate driving power supply 90 of the lower side switching circuit 72 is utilized has been described. However, if it is possible to utilize a supply which can operate the transistors (MOSFETs) that are being used at an even lower voltage, such as a logic circuit power supply voltage, the lower voltage may be utilized.

As has been described above, according to the inkjet head driving circuit 10 of the present embodiment, a pulse width-modulated digital signal based on an input signal is power-amplified by the comparator 32, which performs the pulse width modulation and outputs a digital signal, the digital power amplifier 34, which amplifies power of the digital signal outputted by the comparator 32, and the first filter 36, which smoothes the output of the digital power amplifier 34. Thus, the generation of heat in the inkjet head driving circuit 10 can be suppressed.

Furthermore, there is a risk of the cutoff frequency of the first filter 36 being changed by the piezoelectric actuators $\mathbf{124}_1$ to $\mathbf{124}_n$ which are capacitive loads. However, because the output of the first filter 36 is fed back to the inverting input terminal of the operational amplifier 30 by the first feedback circuit 43, changes in the cutoff frequency of the first filter 36 can be suppressed.

Further still, because the second filter 38, which has a smaller time constant than the first filter 36, is provided and the output of the digital power amplifier 34 is fed back through the second filter 38 to the inverting input terminal of the operational amplifier 30 by the second feedback circuit 41, more stable operations of the inkjet head driving circuit 10 can be achieved.

Figure 3:
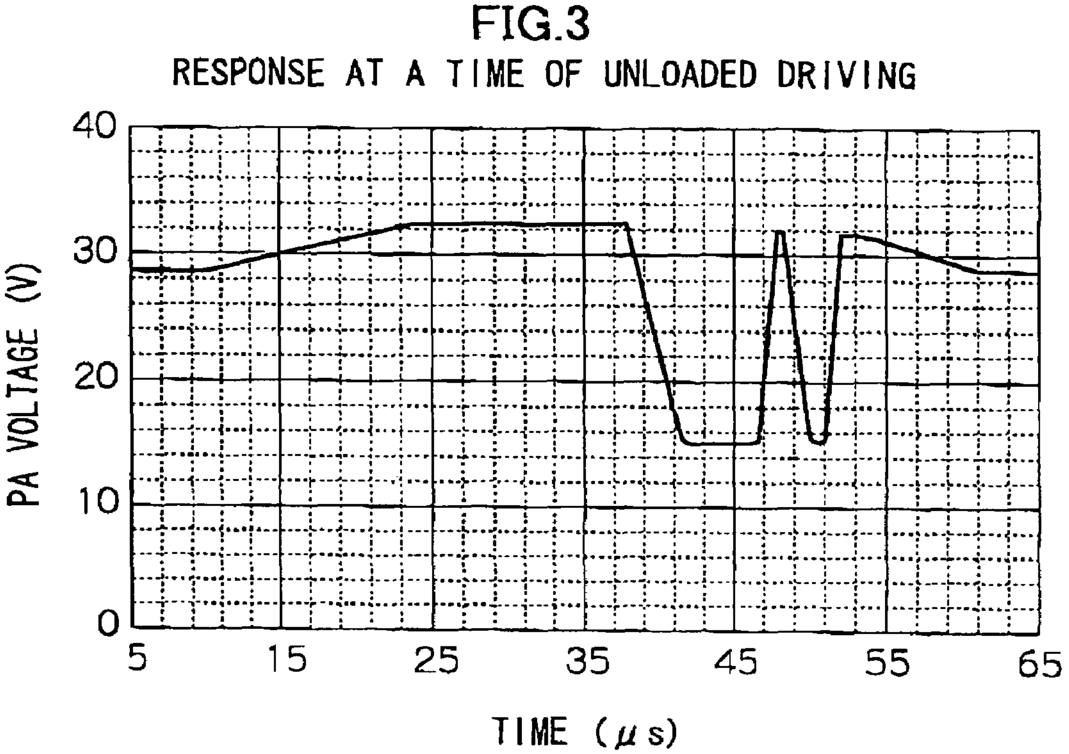
FIG. 3 shows results of a simulation of a waveform of a terminal voltage of a piezoelectric actuator, in a case in which the piezoelectric actuator is singly driven.
Figure 4:
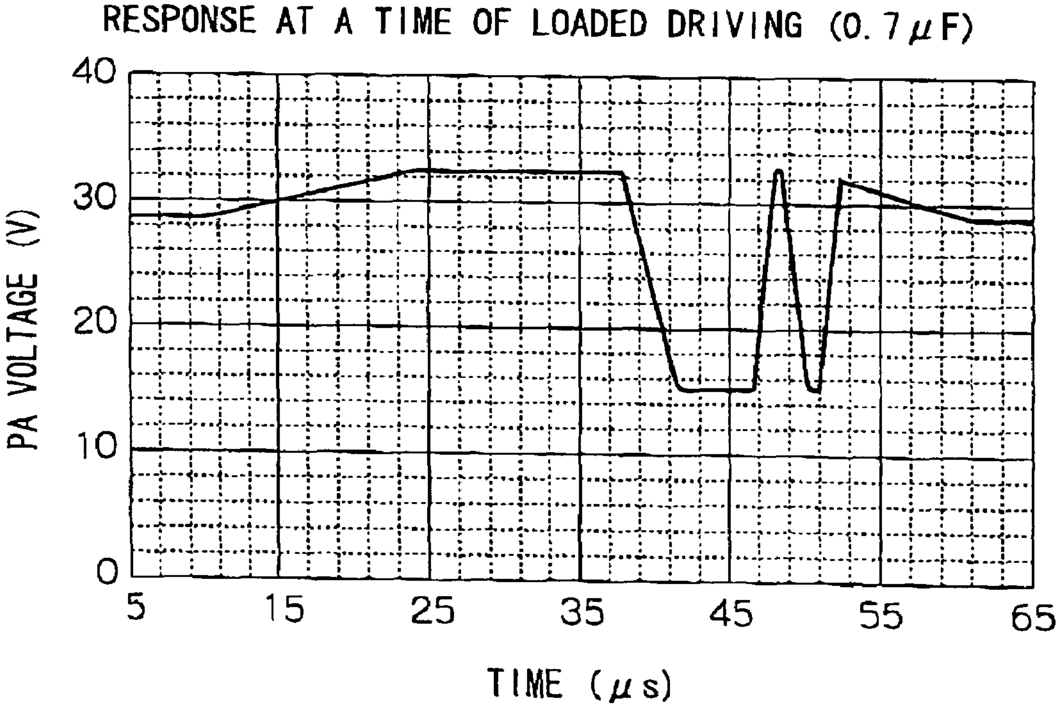
FIG. 4 shows results of a simulation of a waveform of a terminal voltage of a piezoelectric actuator, in a case in which around 1,000 piezoelectric actuators are being driven at the same time.

With the inkjet head driving circuit 10 of the present embodiment, when a driving waveform at the output terminal of the first filter 36 is measured during unloaded driving, corresponding to a time of driving the single piezoelectric actuator $\mathbf{124}_1$, the driving waveform shown in FIG. 3 is obtained. When the driving waveform at the output terminal of the first filter 36 is measured during driving of a load of 0.7 μF, corresponding to a case of driving of around 1,000 of the piezoelectric actuators $\mathbf{124}_1$ to $\mathbf{124}_{1000}$, the driving waveform shown in FIG. 4 is obtained. As shown in FIGS. 3 and 4, with the inkjet head driving circuit 10 of the present embodiment, the number of the actuators $\mathbf{124}_1$ to $\mathbf{124}_n$ that are being driven has no effect, and a substantially constant driving waveform is provided. Thus, greater stability of operations of the inkjet head driving circuit 10 can be realized.

Furthermore, with the digital power amplifier 34, voltage amplification and current amplification are performed by digital techniques, that is, switching operations, and it is possible to inhibit heating of the inkjet head driving circuit 10.

Moreover, because the digital power amplifier 34 is structured to both suppress heating and be capable of rapid switching, heating of the inkjet head driving circuit 10 is suppressed and it is possible to output driving signals in a high frequency region, which are capable of driving the respective piezoelectric actuators $\mathbf{124}_1$ to $\mathbf{124}_n$, to the respective piezoelectric actuators $\mathbf{124}_1$ to $\mathbf{124}_n$.

Figure 5:
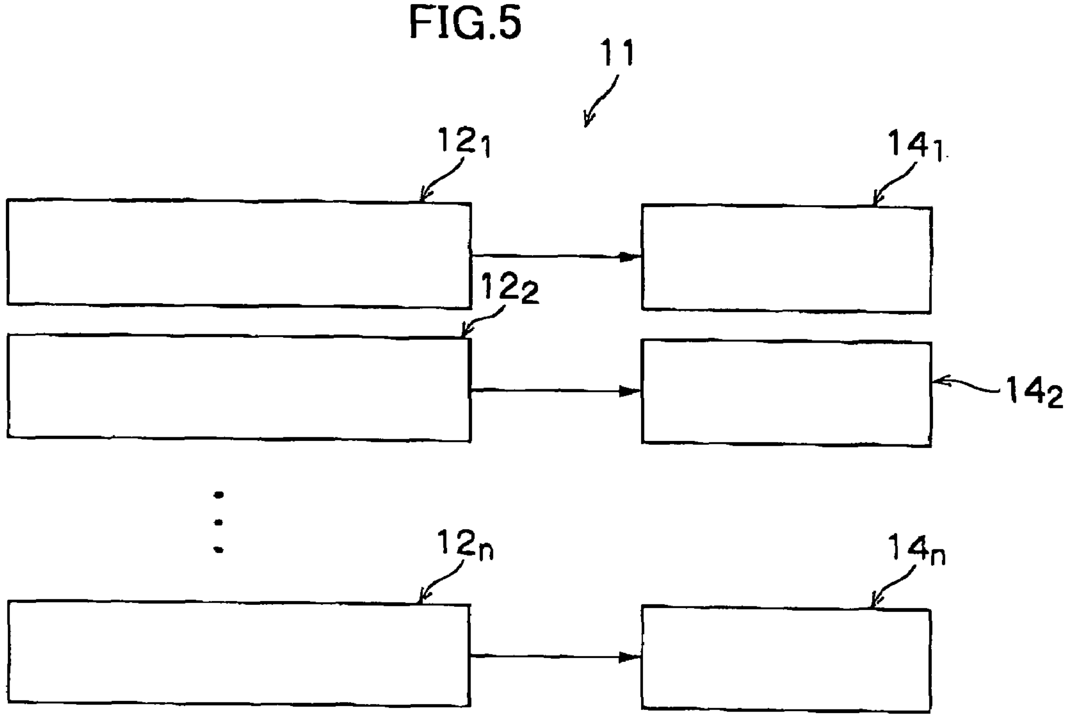
FIG. 5 shows an inkjet recording device which is equipped with a plurality of driving circuit boards and a plurality of heads, which are provided in respective correspondence with the plurality of driving circuit boards.

Here, for the present embodiment, a case in which the single head 14 is provided in correspondence with the single driving circuit board 12 has been described. However, the present invention is not limited to such an embodiment. For example, it is also possible for an inkjet recording device 11, as shown in FIG. 5, to be provided with a plurality of driving circuit boards $\mathbf{12}_1, \mathbf{12}_2, \ldots, \mathbf{12}_n$ serving as the driving circuit board 12, and for heads $\mathbf{14}_1, \mathbf{14}_2, \ldots \mathbf{14}_n$ to be provided so as to correspond one-to-one with the plurality of driving circuit boards $\mathbf{12}_1, \mathbf{12}_2, \ldots \mathbf{12}_n$. Even in the inkjet recording device 11 with the structure in which the plurality of heads 14 and the driving circuit boards 12 in respective correspondence with the plurality of heads 14 are plurally provided, because the driving circuit board 12 of the present invention, which is capable of high-speed switching operations, suppresses heat generation and drives with stability, is plurally provided, it is possible to provide the inkjet recording device 11 to be equipped with the driving circuit boards 12 which suppress heat generation and drive stably. Further, because it is not necessary to provide a separate radiator at an inkjet recording device main body in order to suppress heating of each driving circuit, as in conventional technologies, it is possible to provide a reduction in size of a main body of the inkjet recording device 11.

Figure 6:
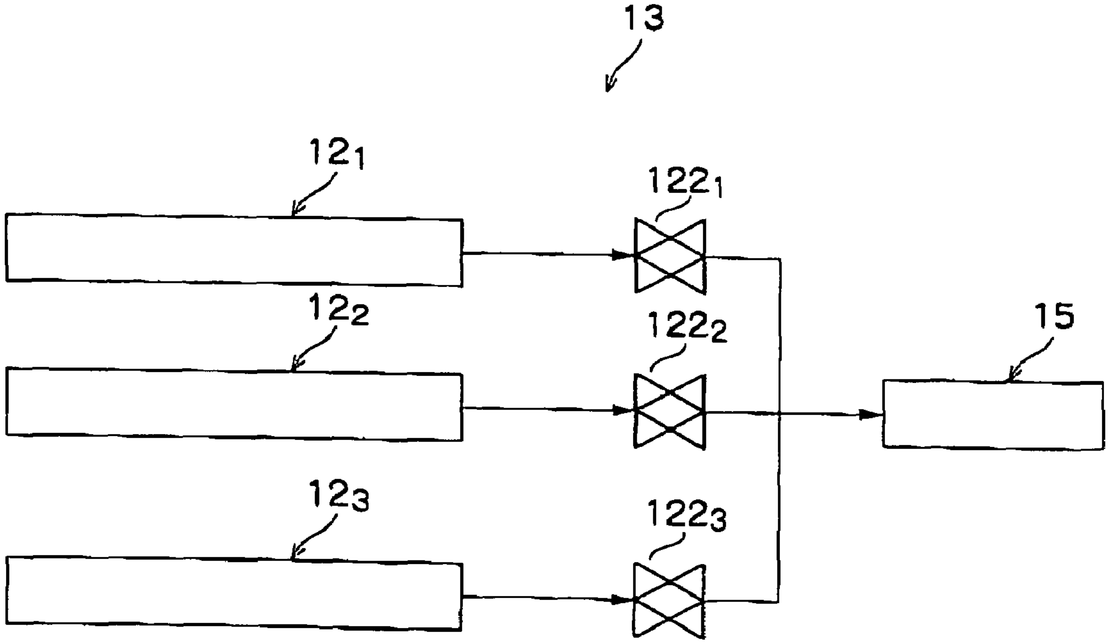
FIG. 6 shows an inkjet recording device which is equipped with a plurality of driving circuit boards corresponding with a single head.

Further, as shown in FIG. 6, it is also possible to provide a single head 15 in association with a plurality of the driving circuit board 12. In such a case, the plurality of driving circuit boards 12 are, for example, specified so as to output respectively different driving signals. For example, waveforms of driving signals to be outputted from the respective driving circuit boards 12 may be established beforehand such that, respectively, the driving circuit board $\mathbf{12}_1$ is a driving circuit board for outputting an input signal for ejecting large ink droplets, the driving circuit board $\mathbf{12}_2$ is a driving circuit board for outputting a driving signal for ejecting medium-size ink droplets, and the driving circuit board $\mathbf{12}_3$ is a driving circuit board for outputting a driving signal for ejecting small ink droplets. Each of the driving circuit board $\mathbf{12}_1$, the driving circuit board $\mathbf{12}_2$ and the driving circuit board $\mathbf{12}_3$ is connected to enable output of the respective input signal outputted from the driving circuit board $\mathbf{12}_1$, driving circuit board $\mathbf{12}_2$ or driving circuit board $\mathbf{12}_3$ through the corresponding transfer gate $\mathbf{122}_1$, transfer gate $\mathbf{122}_2$ or transfer gate $\mathbf{122}_3$, to each of the plurality of piezoelectric actuators $\mathbf{124}_1$ to $\mathbf{124}_n$ provided at the single head 15.

Thus, even with an inkjet recording device 13 with a structure which is provided with the single head 15 in association with the plurality of driving circuit boards 12, the inkjet recording device 13 is structured with each driving circuit board 12 in the form of the driving circuit board 12 of the present invention, which is capable of high-speed switching operations, suppresses heating and drives with stability. Consequently, it is possible to provide the inkjet recording device 13 to suppress heating and drive stably. Accordingly, even with the inkjet recording device 13 with a structure which is capable of varying the form of ink droplets to be ejected, because the driving circuit boards 12 of the inkjet head are structured as the driving circuit board 12 of the present invention which is capable of high-speed switching, suppresses heating and drives stably, stable driving is possible, heat generation can be curbed and an increase in size of apparatus of the inkjet recording device 13 can be restrained.

SECOND EMBODIMENT

For the first embodiment, the inkjet head driving circuit 10 shown in FIG. 1 has been described. In this inkjet head driving circuit 10, the output terminal of the first filter 36 is connected, via the first feedback circuit 43 including the smoothing circuit 42, to the inverting input terminal of the operational amplifier 30 and the output terminal of the digital power amplifier 34 is connected via the second feedback circuit 41, which includes the second filter 38 and the smoothing circuit 40 structured by the resistor R7 and the capacitor C5 connected in parallel with the resistor R7, to the inverting input terminal of the operational amplifier 30. For the second embodiment, a case which further includes a third feedback circuit, which feeds back output of the first filter 36 through a wiring resistance to the inverting input terminal of the operational amplifier 30, will be described.

Figure 7:
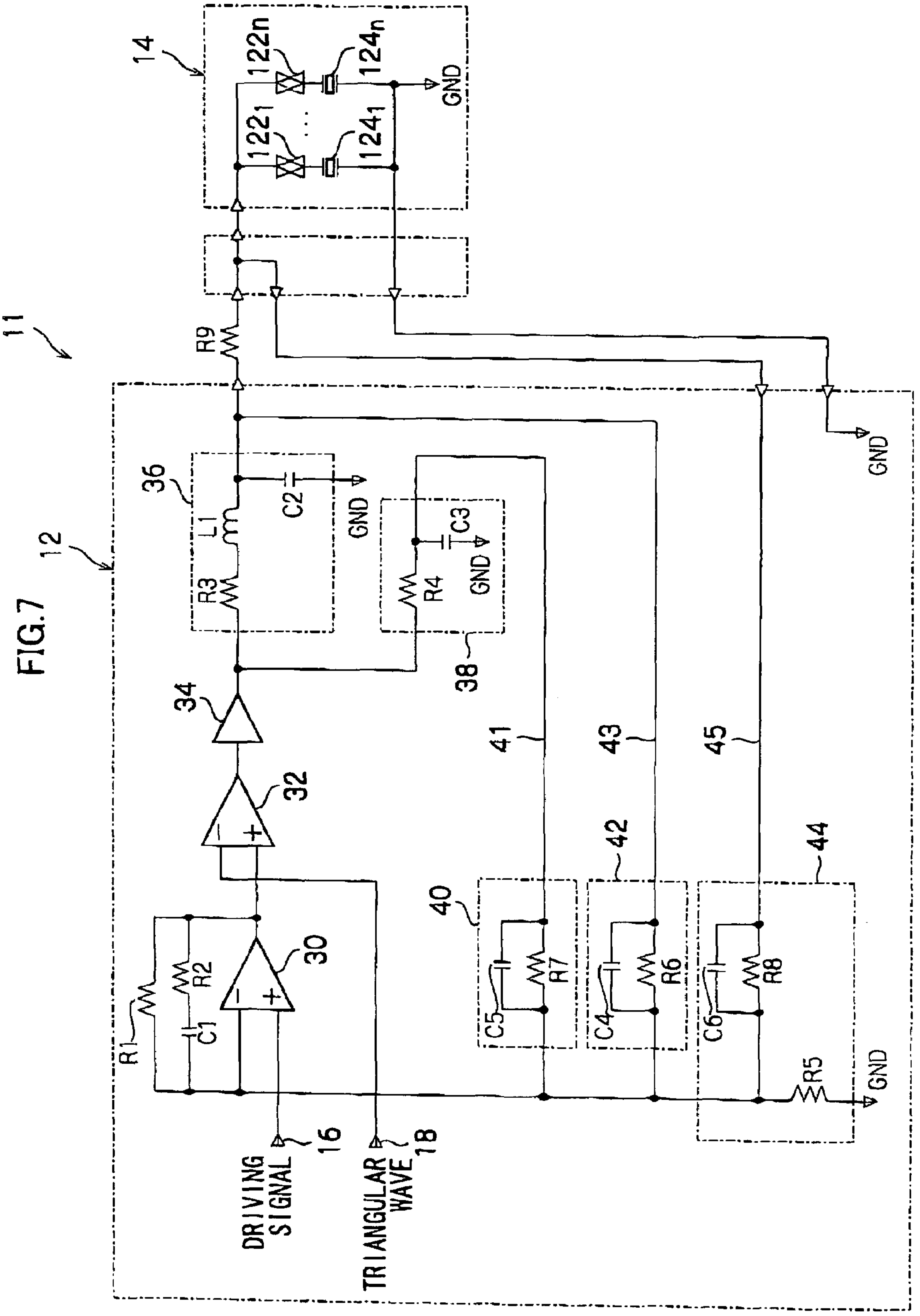
FIG. 7 is an inkjet head driving circuit relating to a second embodiment of the present invention.

If a wiring resistance R9 between the driving circuit board 12 and the head 14 as shown in FIG. 7 is large, a low-pass filter is structured by the piezoelectric actuators $\mathbf{124}_1$ to $\mathbf{124}_n$ which are capacitive loads, and the wiring resistance R9. In such a case, if the output from the first filter 36 is fed back through the wiring resistance R9 between the first filter 36 and the respective piezoelectric actuators $124_1$ to $124_n$ to the inverting input terminal of the operational amplifier 30, the feedback circuit is a structure which includes a third order delay element constituted by the second order delay element of the first filter 36 and a first order delay element of the wiring resistance R9 and the capacitive load of the piezoelectric actuators $124_1$ to $124_n$. Accordingly, if the wiring resistance R9 between the driving circuit board 12 and the head 14 is large, there is a risk of operations of the inkjet head driving circuit 10 being more unstable than in a case in which the wiring resistance R9 is small.

Accordingly, in an inkjet head driving circuit 11 of the present embodiment, a third feedback circuit 45 is provided as an addition to the inkjet head driving circuit 10 of the first embodiment.

Because the inkjet head driving circuit 11 of the second embodiment has a substantially similar structure to the inkjet head driving circuit 10 of the first embodiment, the same reference numerals are assigned to portions that are the same, and descriptions thereof will be omitted.

The output terminal of the first filter 36 is connected to the inverting input terminal of the operational amplifier 30 via the wiring resistance R9 and the third feedback circuit 45. The third feedback circuit 45 is provided with a smoothing circuit 44, which is structured by a resistor R8 and a capacitor C6, which is connected in parallel with the resistor R8.

A feedback loop structured by the third feedback circuit 45 features a third order delay element, which is formed by the second order delay element constituted by the first filter 36 and the first order delay element constituted by the wiring resistance R9 and the piezoelectric actuators 124. Further, the second order delay element constituted by the first filter 36 is included in the feedback loop constituted by the first feedback circuit 43. Further still, the first order delay element constituted by the second filter 38 is included in the feedback loop constituted by the second feedback circuit 41. Therefore, the inkjet head driving circuit 11 has a structure in which the feedback loop constituted by the first feedback circuit 43, which includes the first filter 36 featuring the second order delay element, is provided at the inner side of the feedback loop constituted by the third feedback circuit 45, which features the third order delay element, and the feedback loop constituted by the second feedback circuit 41, which includes the second filter 38 featuring the first order delay element, is provided at the inner side of the feedback loop constituted by the first feedback circuit 43, which includes the first filter 36 featuring the second order delay element. In this manner, feedback loops are structured at inner side feedback loops to include filters with smaller time constants than outer side feedback loops, so as to compensate for phase delays of the outer side feedback loops. Hence, greater stability of operations of the inkjet head driving circuit 11 can be expected.

It is not necessary to provide the inkjet head driving circuit 11 with all three of these feedback loops—the feedback loop of the third feedback circuit 45, the feedback loop of the first feedback circuit 43 including the first filter 36, and the feedback loop of the second feedback circuit 41 including the second filter 38. For example, two feedback loops may be provided, in accordance with the magnitude of the capacitive load of the respective piezoelectric actuators $124_1$ to $124_n$ and the time constants of the first filter 36 and the second filter 38; for example, it is possible to provide the feedback loop of the third feedback circuit 45 and the feedback loop of the second feedback circuit 41 including the second filter 38, or to provide the feedback loop of the first feedback circuit 43 including the first filter 36 and the feedback loop of the second feedback circuit 41 including the second filter 38.

THIRD EMBODIMENT

Figure 8:
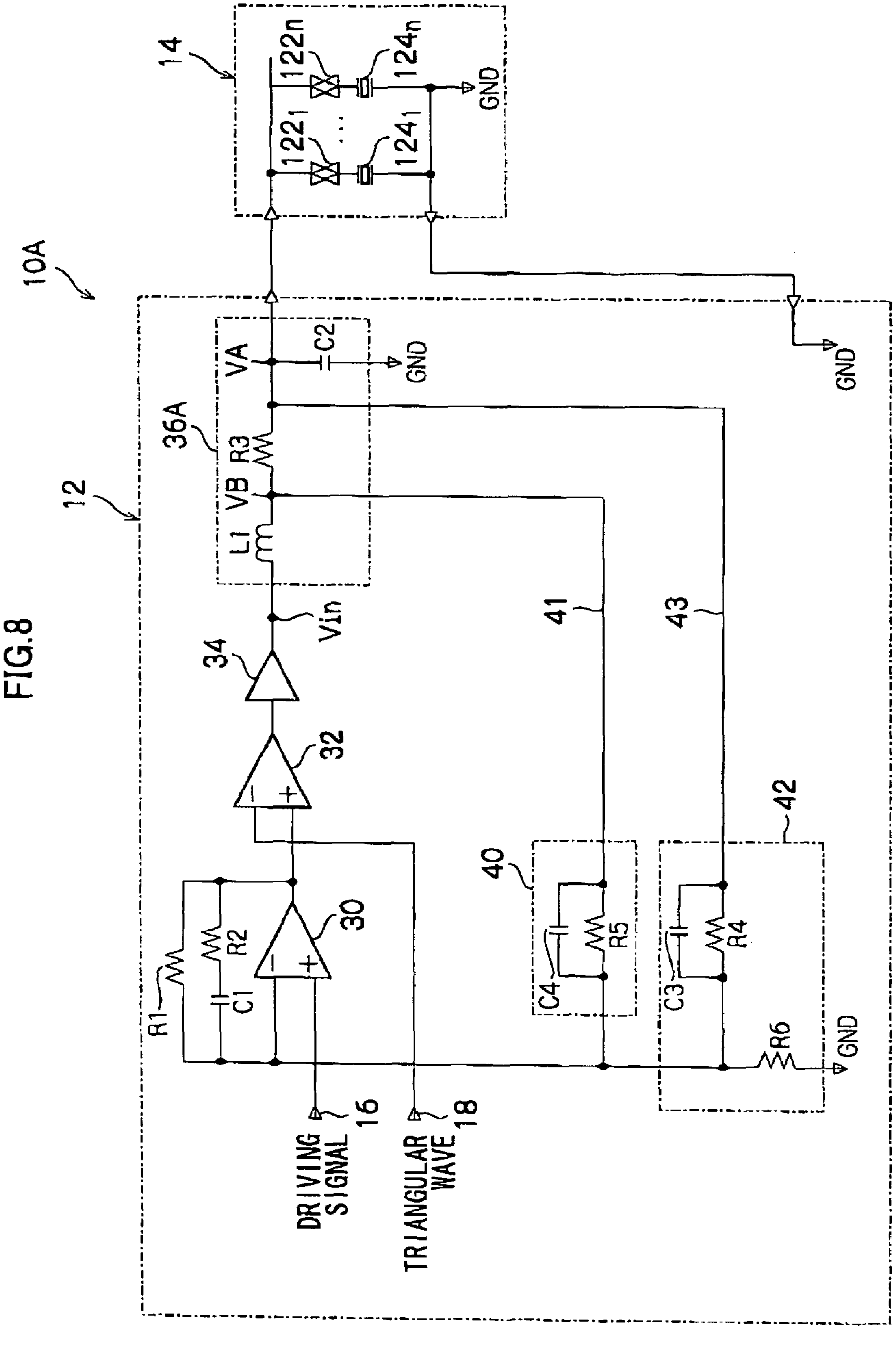
FIG. 8 is an inkjet head driving circuit relating to a third embodiment of the present invention.

FIG. 8 is a circuit diagram showing an inkjet head driving circuit 10A relating to the third embodiment. The inkjet head driving circuit 10A of the third embodiment is a circuit in which the second filter 38 is removed from the inkjet head driving circuit 10 shown in FIG. 1 and a first filter 36A is provided instead of the first filter 36. In FIG. 8, circuits that are the same as circuits shown in FIG. 1 are assigned the same reference numerals, and detailed descriptions thereof are omitted.

The first filter 36A is provided with the inductor L1, the resistor R3 and the capacitor C2. One terminal of the inductor L1 is connected to the output terminal of the digital power amplifier 34 and the other terminal of the inductor L1 is connected to the resistor R3. Another terminal of the resistor R3 (the terminal thereof that is not connected to the inductor L1) is connected to the capacitor C2 and the transfer gates $122_1$ to $122_n$ of the head 14. Another terminal of the capacitor C2 (the terminal that is not connected to the resistor R3) is connected to ground (GND).

The second feedback circuit 41 feeds back output of the inductor L1 to the inverting input terminal of the operational amplifier 30. The first feedback circuit 43 feeds back output of the resistor R3 to the inverting input terminal of the operational amplifier 30. Thus, the first filter 36A is a circuit in which positions of the inductor L1 and the resistor R3 in the first filter 36 shown in FIG. 1 are exchanged.

Herein, an output voltage of the digital power amplifier 34 is referred to as Vin, an output voltage of the inductor L1 is VB and an output voltage of the resistor R3 is VA. The voltage VB is the voltage that is fed back to the operational amplifier 30 by the second feedback circuit 41. The voltage VA is both a terminal voltage of the piezoelectric actuators 124 and the voltage that is fed back to the operational amplifier 30 by the first feedback circuit 43. Here, gain of the voltage VA with respect to the voltage Vin is shown by equation (1), and gain of the voltage VB with respect to the voltage Vin is shown by equation (2).

$$\frac{VA}{Vin} = \frac{\omega_0^2}{s^2 + 2\varsigma\omega_0 s + \omega_0^2} \tag{1}$$

$$\frac{VB}{Vin} = \frac{2\varsigma\omega_0 s}{s^2 + 2\varsigma\omega_0 s + \omega_0^2} \tag{2}$$

$$\omega_0 = \frac{1}{\sqrt{L1 \cdot C2}} \quad \varsigma = \frac{R3}{2}\sqrt{\frac{C2}{L1}}$$

Considering equation (2), which represents a first order delay element, in the light of equation (1), which represents a second order delay element, equation (2) represents a first order advancing element with respect to equation (1). That is, phase of the voltage VB is advanced relative to the voltage VA. Consequently, the second feedback circuit 41 compensates for phase delays in the high frequency region, which are caused by the first feedback circuit 43, by adding the voltage VB to the voltage VA which is fed back by the first feedback circuit 43. Thus, the second feedback circuit 41 can stabilize operations of the first filter 36A in the high frequency region.

As described above, in the inkjet head driving circuit 10A relating to the third embodiment, the voltage VB, whose phase is advanced relative to the voltage VA of the first feedback circuit 43, is drawn from the first filter 36A and this voltage VB is added to the voltage VA, as a result of which it is possible to stabilize operations of the first filter 36A in the high frequency region. Further, because it is not necessary to provide the inkjet head driving circuit 10A with the second filter 38, which is a necessary structural element of the inkjet head driving circuit 10 relating to the first embodiment, costs can be kept down and size of the circuit can be reduced.

FOURTH EMBODIMENT

Figure 9:
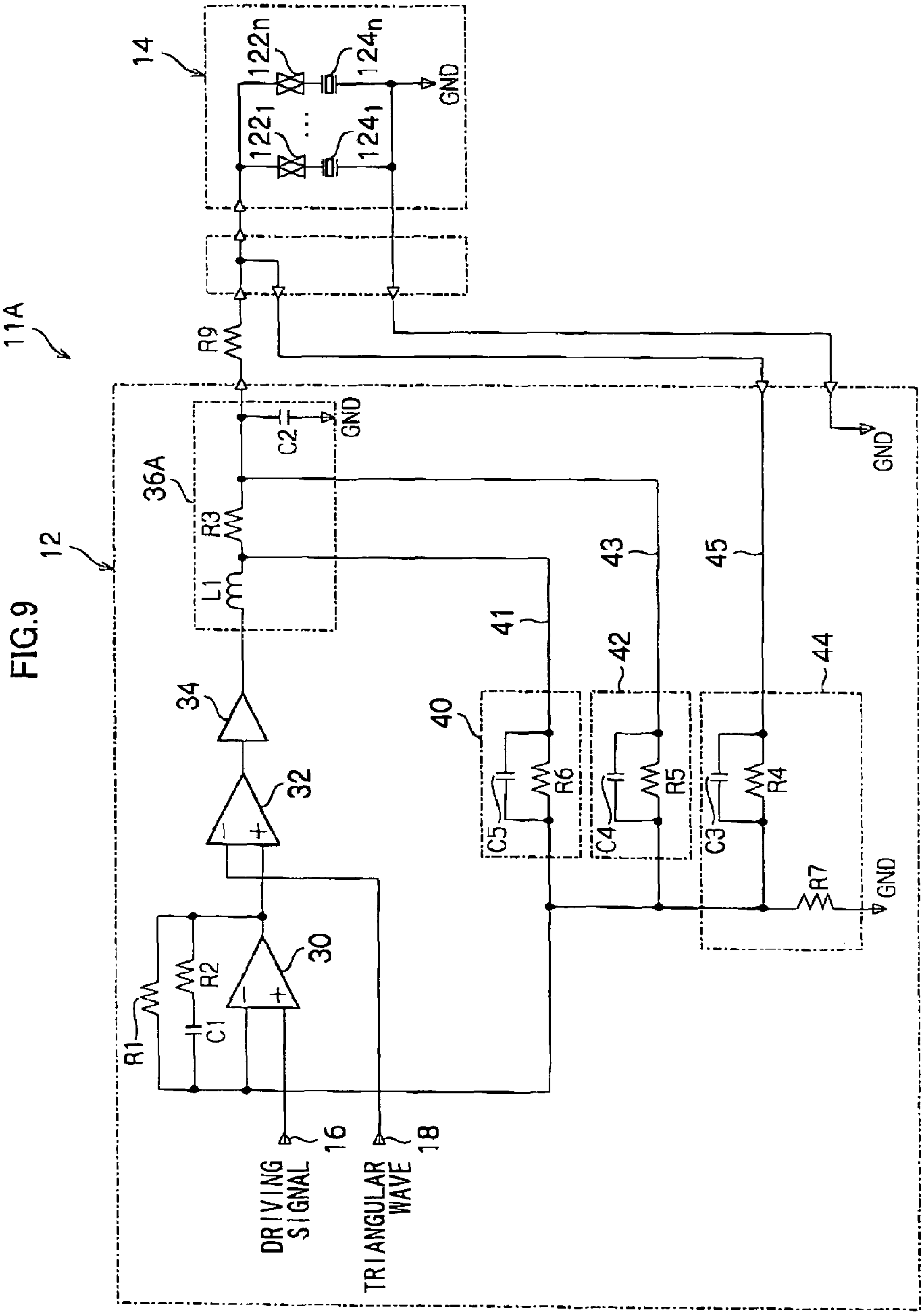
FIG. 9 is an inkjet head driving circuit relating to a fourth embodiment of the present invention.

FIG. 9 is a circuit diagram showing an inkjet head driving circuit 11A relating to the fourth embodiment. The inkjet head driving circuit 11A of the fourth embodiment is a circuit in which the second filter 38 is removed from the inkjet bead driving circuit 11 shown in FIG. 7 and the first filter 36A shown in FIG. 8 is provided instead of the first filter 36. In FIG. 9, circuits that are the same as previously illustrated circuits are assigned the same reference numerals, and detailed descriptions thereof are omitted.

The feedback loop structured by the third feedback circuit 45 includes a third order delay element formed by the second order delay element constituted by the first filter 36A and the first order delay element constituted by the wiring resistance R9 and the piezoelectric actuators 124. The feedback loop constituted by the first feedback circuit 43 includes the second order delay element constituted by the first filter 36A. The feedback loop constituted by the second feedback circuit 41 includes the first order delay element, with first order advancement, constituted by the first feedback circuit 43.

Thus, the inkjet head driving circuit 11A relating to the fourth embodiment adds voltages whose respective phases are advanced to the terminal voltage of the piezoelectric actuators that is fed back by the third feedback circuit 45. As a result, no effect is exerted on the inkjet head driving circuit 11A by the wiring resistance R9 and capacitances of the piezoelectric actuators 124, and operations can be stabilized. Further, because it is not necessary to provide the inkjet head driving circuit 11A with the second filter 38, which is a necessary structural element of the inkjet head driving circuit 11 relating to the second embodiment, costs can be kept down and size of the circuit can be reduced.

Now, the present invention is not limited to the embodiments described above, and may be applied to various structures within the scope described in the attached claims. For example, the present invention may be applied to an inkjet head unit in which a driving circuit is incorporated. In the embodiments described above, inkjet head driving circuits have been offered as examples of driving circuits for driving capacitive loads whose capacitances are changeable. Alternatively, the present invention may be applied to, for example, a head driving circuit for ejecting droplets from the head of a semiconductor pattern-forming apparatus. Further, the present invention may assume, for example, the following aspects.

An inkjet head driving circuit of a first aspect of the present invention is a driving circuit of an inkjet head which includes a piezoelectric actuator corresponding with a pressure generation chamber which is charged with ink to be ejected from a nozzle, the driving circuit causing an ink droplet to be ejected from the nozzle by applying a driving signal to the piezoelectric actuator for altering a capacity of the pressure generation chamber. The inkjet head driving circuit is structured to include: an operational amplifier, which outputs a differential signal between a signal which is fed back to an inverting input terminal and an input signal which is inputted to a non-inverting input terminal; a pulse width modulator, which pulse width-modulates output of the operational amplifier and outputs a digital signal; a digital power amplifier, which amplifies power of the digital signal; a first filter, which smooths output of the digital power amplifier and inputs the smoothed signal to the piezoelectric actuator as the driving signal for causing an ink droplet to be ejected from the nozzle of the inkjet head; a first feedback circuit, which feeds back the driving signal outputted from the first filter to the inverting input terminal of the operational amplifier; and a second feedback circuit, which includes a second filter for smoothing output of the digital amplifier and which feeds back a signal smoothed by the second filter to the inverting input terminal of the operational amplifier.

An inkjet head driving circuit of the present invention may further include a third feedback circuit, which feeds back the driving signal, which has been outputted from the first filter and propagated through wiring resistance between the first filter and the piezoelectric actuator, to the inverting input terminal of the operational amplifier.

When a wiring resistance is present between the first filter and the piezoelectric actuators, a filter with a higher degree of smoothing than the first filter is structured by the wiring resistance and the piezoelectric actuators, and there is a danger that the waveform of the driving signal inputted to the piezoelectric actuators will be degraded. Accordingly, the inkjet head driving circuit further includes the third feedback circuit, which feeds back the driving signals outputted from the first filter and propagated through the wiring resistance between the first filter and the piezoelectric actuators to the inverting input terminal of the operational amplifier. As a result, even though the wiring resistance is present between the piezoelectric actuators and the first filter, because the driving signal propagated through the wiring resistance is fed back to the inverting input terminal of the operational amplifier by the third feedback circuit, degradation of the waveform of the driving signal to be inputted to the piezoelectric actuators can be suppressed.

The third feedback circuit feeds back the driving signal that has been smoothed by the respective filters structured by the wiring resistance and the piezoelectric actuators. Thus, the third feedback circuit feeds back a driving signal that has been smoothed by a filter with a greater degree of smoothing than the first filter. Consequently, there is a risk that operations of the inkjet head driving circuit will become unstable. However, because the first feedback circuit feeds back the driving signals outputted from the first filter, which is a filter with a lesser degree of smoothing than the above-mentioned filters, to the operational amplifier, a reduction in stability of operations of the inkjet head driving circuit that is caused by the provision of the third feedback circuit can be curbed. Further, because the second feedback circuit feeds back the driving signal outputted from the second filter, which is a filter with an even smaller degree of smoothing than the first filter, to the operational amplifier, it is possible to further suppress a reduction in stability of operations of the inkjet head driving circuit.

Thus, even when the wiring resistance is included between the piezoelectric actuators and the driving circuit, it is possible to effectively remedy waveform degradation of the driving signal, and it is possible to achieve stability of the inkjet head driving circuit.

An inkjet head driving circuit of another aspect of the present invention is an inkjet head driving circuit which includes: an operational amplifier, which outputs a differential signal between a signal which is fed back to an inverting input terminal and an input signal which is inputted to a non-inverting input terminal; a pulse width modulator, which pulse width-modulates output of the operational amplifier and outputs a digital signal; a digital power amplifier, which amplifies power of the digital signal; a first filter, which smooths output of the digital power amplifier and inputs a driving signal to a piezoelectric actuator for causing an ink droplet to be ejected from a nozzle of the inkjet head; a second feedback circuit, which includes a second filter for smoothing output of the digital power amplifier and which feeds back a signal smoothed by the second filter to the inverting input terminal of the operational amplifier; and a third feedback circuit, which feeds back the driving signal, which has been outputted from the first filter and propagated through wiring resistance between the first filter and the piezoelectric actuator, to the inverting input terminal of the operational amplifier.

The digital power amplifier of the inkjet head driving circuit includes: an upper side switching circuit, which includes an upper side voltage amplification circuit for amplifying voltage of the digital signal, an upper side switching element which turns on when the digital signal is at a high level, and an upper side current amplification circuit for amplifying current of the digital signal, the upper side switching circuit performing voltage amplification and current amplification and charging the piezoelectric actuator when the upper side switching element is on; and a lower side switching circuit, which includes a lower side voltage amplification circuit for amplifying voltage of the digital signal, a lower side switching element which turns on when the digital signal is at a low level, and a lower side current amplification circuit for amplifying current of the digital signal, the lower side switching circuit performing voltage amplification and current amplification and discharging the piezoelectric actuator when the lower side switching element is on.

The digital power amplifier is structured to include the upper side switching circuit and the lower side switching circuit. The upper side switching circuits is provided with the upper side voltage amplification circuit, which amplifies voltage of the digital signal, the upper side current amplification circuit, which amplifies current of the digital signal, and the upper side switching element. The upper side switching circuit performs voltage amplification and current amplification in accordance with the inputted digital signal. The lower side switching circuit is provided with the lower side voltage amplification circuit, which amplifies voltage of the digital signal, the lower side current amplification circuit, which amplifies current of the digital signal, and the lower side switching element. The lower side switching circuit performs voltage amplification and current amplification in accordance with the inputted digital signal. The upper side switching element turns on when the digital signal is at the high level, and the piezoelectric actuators are charged up when the upper side switching element is on. The lower side switching element turns on when the digital signal is at the low level, and the piezoelectric actuators are discharged when the lower side switching element is on.

Thus, the digital power amplifier is structured so as to perform current application and voltage amplification using switching operations, which are a digital technique, and the digital power amplifier can charge and discharge the piezoelectric actuators. Thus, power consumption and heat generation amounts of the inkjet head driving circuit can be suppressed in comparison with a case in which an analog amplification circuit is employed as the power amplifier.

A capacitor may be provided at an output of the upper side current amplification circuit, the capacitor may be connected, via a diode, with a driving power supply which drives the lower side switching circuit, and the upper side voltage amplification circuit may be driven by charge which has been charged onto the capacitor.

The capacitor is provided at the output of the upper side current amplification circuit, and the capacitor is connected, via the diode, to the driving power supply for driving the lower side switching circuit. Charge is supplied to the capacitor by the driving power supply for driving the lower side driving circuit when the lower side switching circuit is discharging the piezoelectric actuators, and the upper side voltage amplification circuit is driven by the charge supplied to the capacitor. As a result, it is possible to drive the upper side voltage amplification circuit with the driving power supply for driving the lower side switching circuit, rather than providing a dedicated driving power supply for the upper side switching circuit.

The upper side switching element and the lower side switching element may be structured with N-channel MOSFETs.

It is known that a driving signal for the piezoelectric actuators is in a frequency range of 100s of kHz. Accordingly, high-speed switching operations are required of the digital power amplifier. When N-channel MOSFETs, which are capable of switching operations at high speeds, are employed at the upper side switching element and the lower side switching element, it is possible to implement rapid switching operations with the upper side switching circuit and the lower side switching circuit.

The upper side current amplification circuit may further include a push-pull type upper side buffer circuit, which is connected, via an upper side gate resistor and an upper side second capacitor, with the upper side switching element and which amplifies current of the digital signal, and the lower side current amplification circuit may further include a push-pull type lower side buffer circuit, which is connected, via a lower side gate resistor and a lower side second capacitor, with the lower side switching element and which amplifies current of the digital signal.

The push-pull type upper side buffer circuit and lower side buffer circuit are provided to serve as current amplification circuits at the upper side current amplification circuit and the lower side current amplification circuit, respectively. When the push-pull type buffer circuits are employed as the current amplification circuits in this manner, even if both the upper side switching element and the lower side switching element feature input capacitances, it is possible to quickly charge and discharge these input capacitances. Hence, it is possible to operate the upper side switching element and the lower side switching element quickly.

Moreover, when the upper side gate resistance is connected between the upper side buffer circuit and the upper side switching element, and the lower side gate resistance is connected between the lower side buffer circuit and the lower side switching element, speeds of charging and discharging of the gate capacitances of the upper side switching element and the lower side switching element can be restrained, and the generation of noise when the upper side switching element and the lower side switching element are performing switching operations at high speeds can be suppressed.

Further, because the upper side second capacitor is also connected, via the upper side gate resistance, between the upper side buffer circuit and the upper side switching circuit and the lower side second capacitor is also connected, via the lower side gate resistance, between the lower side buffer circuit and the lower side switching circuit, respective turn-off times of the upper side switching element and the lower side switching element can be shortened by the upper side second capacitor and the lower side second capacitor, respectively. As a result, the upper side switching element and the lower side switching element can be prevented from turning on at the same time.

The upper side voltage amplification circuit includes an upper side level-conversion circuit which includes an upper side first MOSFET with a driving power supply via an upper side second resistor, the upper side first MOSFET turning on when the digital signal is at the low level, and the upper side second resistor being connected in parallel with an upper side second MOSFET, which turns on when the digital signal is at the low level, and the lower side voltage amplification circuit includes a lower side level-conversion circuit which includes a lower side first MOSFET with the driving power supply via a lower side second resistor, the lower side first MOSFET turning on when the digital signal is at the high level, and the lower side second resistor being connected in parallel with a lower side second MOSFET, which turns on when the digital signal is at the low level.

The upper side voltage amplification circuit includes the upper side level-conversion circuit for amplifying the voltage of the digital signal. The upper side level-conversion circuit is a structure which is provided with the upper side first MOSFET, which turns on when the digital signal is at the low level, and at which the upper side first MOSFET is connected through the upper side second resistance to the driving power supply. The upper side level-conversion circuit functions as a circuit for implementing voltage amplification of the digital signal. In a state of switching of the upper side first MOSFET from on to off, current from the driving power supply flows into the feedback capacitance between the drain and gate of the upper side first MOSFET. However, this feedback capacitance between the drain and gate is known to be small and, in order to operate the upper side first MOSFET rapidly, it is necessary for the value of the upper side second resistance to be made small. On the other hand, if current flows from the driving power supply into the upper side first MOSFET when the upper side first MOSFET is on, a large amount of heat will be generated. In the upper side voltage amplification circuit of the present invention, the upper side second MOSFET, which turns on when the digital signal is at the low level, is connected to the upper side second resistance. Thus, when the digital signal is at the low level, the upper side second MOSFET is on, and the upper side second resistance can be bypassed. Hence, it is possible to operate the upper side first MOSFET quickly, and it is possible to suppress heating of the upper side second resistance.

Similarly, the lower side voltage amplification circuit includes the lower side level-conversion circuit for amplifying the voltage of the digital signal. The lower side level-conversion circuit is a structure which is provided with the lower side first MOSFET, which turns on when the digital signal is at the low level, and at which the lower side first MOSFET is connected through a lower side second resistance to the driving power supply. The lower side level-conversion circuit functions as a circuit for implementing voltage amplification of the digital signal. In a state of switching of the lower side first MOSFET from on to off, current from the driving power supply flows into the feedback capacitance between the drain and gate of the lower side first MOSFET. However, this feedback capacitance between the drain and gate is known to be small and, in order to operate the lower side first MOSFET rapidly, it is necessary for the value of the lower side second resistance to be made small. On the other hand, if current flows from the driving power supply into the lower side first MOSFET when the lower side first MOSFET is on, a large amount of heat will be generated. In the lower side voltage amplification circuit of the present invention, the lower side second MOSFET, which turns on when the digital signal is at the low level, is connected to the lower side second resistance. Thus, when the digital signal is at the low level, the lower side second MOSFET is on, and the lower side second resistance can be bypassed. Hence, it is possible to operate the lower side first MOSFET quickly, and it is possible to suppress heating of the lower side second resistance.

In an inkjet recording device of another aspect of the present invention, a plurality of inkjet head driving circuits are provided for each nozzle. The plurality of inkjet driving circuits are respectively specified so as to, for example, output mutually different driving signals with mutually different amplitudes and charging/discharging durations, so as to eject ink droplets of differing sizes from the nozzles. In an inkjet recording device with such a structure, because the plurality of inkjet head driving circuits are each structured as the inkjet head driving circuit of the first aspect or the second aspect, suppression of heat generation in the inkjet recording device and stabilization of operations of the inkjet head driving circuits can be expected.

As described above, according to an inkjet head driving circuit of the present invention, a pulse width-modulated digital signal based on an input signal is power-amplified by: a pulse width modulator which performs pulse width modulation and outputs a digital signal; a digital power amplifier which amplifies power of the digital signal outputted by the pulse width modulator; and a first filter which smooths the output of the digital power amplifier and outputs an input signal. Thus, it is possible to inhibit the generation of heat in the inkjet head driving circuit. In addition, the driving signal outputted from the first filter feeds back to the operational amplifier, and a signal smoothed by a second filter, which smooths output of the digital power amplifier, also feeds back to the operational amplifier. Therefore, it is possible to inhibit degradation of the waveform of a driving signal to be outputted to piezoelectric actuators, and it is possible to provide an inkjet head driving circuit and an inkjet recording device which are capable of realizing stable driving circuit operations.

What is claimed is:

1. A capacitive load driving circuit which applies a driving signal to a capacitive load for driving the capacitive load, the capacitive load driving circuit comprising:

an operational amplifier, which outputs a differential signal between a signal which is fed back to an inverting input terminal and an input signal which is inputted to a non-inverting input terminal;

a pulse width modulator, which pulse width-modulates output of the operational amplifier and outputs a digital signal;

a digital power amplifier, which amplifies power of the digital signal;

a first filter, which smooths output of the digital power amplifier and inputs the smoothed signal to the capacitive load as the driving signal;

a first feedback circuit, which feeds back the driving signal outputted from the first filter to the inverting input terminal of the operational amplifier; and a second feedback circuit, which feeds back a signal outputted from the digital power amplifier, which signal includes a phase which is advanced relative to the driving signal, to the inverting input terminal of the operational amplifier.

2. The capacitive load driving circuit of claim 1, wherein the second feedback circuit includes a second filter, which smooths the output of the digital power amplifier, and the second feedback circuit feeds back a signal smoothed by the second filter to the inverting input terminal of the operational amplifier.

3. The capacitive load driving circuit of claim 1, further comprising a third feedback circuit, which feeds back the driving signal, which has been outputted from the first filter and propagated through wiring resistance between the first filter and the capacitive load, to the inverting input terminal of the operational amplifier.

4. The capacitive load driving circuit of claim 1, wherein the first filter includes an inductor, which is connected to an output terminal of the digital power amplifier, a resistor, which is connected to an output side of the inductor, and a capacitor, one terminal of which is connected to an output side of the resistor and the other terminal of which is connected to ground, a signal outputted from the resistor being inputted to the capacitive load as the driving signal.

5. The capacitive load driving circuit of claim 1, wherein the digital power amplifier includes:

an upper side switching circuit, which includes an upper side voltage amplification circuit for amplifying voltage of the digital signal, an upper side switching element which turns on when the digital signal is at a high level, and an upper side current amplification circuit for amplifying current of the digital signal, the upper side switch ing circuit performing voltage amplification and current amplification and charging the capacitive load when the upper side switching element is on; and a lower side switching circuit, which includes a lower side voltage amplification circuit for amplifying voltage of the digital signal, a lower side switching element which turns on when the digital signal is at a low level, and a lower side current amplification circuit for amplifying current of the digital signal, the lower side switching circuit performing voltage amplification and current amplification and discharging the capacitive load when the lower side switching element is on.

6. The capacitive load driving circuit of claim 5, wherein a capacitor is provided at an output of the upper side current amplification circuit, the capacitor is connected, via a diode, with a driving power supply which drives the lower side switching circuit, and the upper side voltage amplification circuit is driven by charge which has been charged onto the capacitor.

7. The capacitive load driving circuit of claim 5, wherein the upper side switching element is an N-channel MOSFET and the lower side switching element is an N-channel MOSFET.

8. The capacitive load driving circuit of claim 7, wherein the upper side current amplification circuit further includes a push-pull type upper side buffer circuit, which is connected, via an upper side gate resistor and an upper side second capacitor, with the upper side switching element and which amplifies current of the digital signal, and the lower side current amplification circuit further includes a push-pull type lower side buffer circuit, which is connected, via a lower side gate resistor and a lower side second capacitor, with the lower side switching element and which amplifies current of the digital signal.

9. The capacitive load driving circuit of claim 7, wherein the upper side voltage amplification circuit includes an upper side level-conversion circuit which includes an upper side first MOSFET with a driving power supply via an upper side second resistor, the upper side first MOSFET turning on when the digital signal is at the low level, and the upper side second resistor being connected in parallel with an upper side second MOSFET, which turns on when the digital signal is at the low level, and the lower side voltage amplification circuit includes a lower side level-conversion circuit which includes a lower side first MOSFET with the driving power supply via a lower side second resistor, the lower side first MOSFET turning on when the digital signal is at the high level, and the lower side second resistor being connected in parallel with a lower side second MOSFET, which turns on when the digital signal is at the low level.

10. A capacitive load driving circuit which applies a driving signal to a capacitive load for driving the capacitive load, the capacitive load driving circuit comprising:

an operational amplifier, which outputs a differential signal between a signal which is fed back to an inverting input terminal and an input signal which is inputted to a non-inverting input terminal;

a pulse width modulator, which pulse width-modulates output of the operational amplifier and outputs a digital signal;

a digital power amplifier, which amplifies power of the digital signal;

a first filter, which smooths output of the digital power amplifier and inputs the smoothed signal to the capacitive load as the driving signal;

a second feedback circuit, which feeds back a signal outputted from the digital power amplifier, which signal includes a phase which is advanced relative to the driving signal, to the inverting input terminal of the operational amplifier; and a third feedback circuit, which feeds back the driving signal, which has been outputted from the first filter and propagated through wiring resistance between the first filter and the capacitive load to the inverting input terminal of the operational amplifier.

11. A capacitive load driving circuit which applies a driving signal to a capacitive load for driving the capacitive load, the capacitive load driving circuit comprising:

an operational amplifier, which outputs a differential signal between a signal which is fed back to an inverting input terminal and an input signal which is inputted to a non-inverting input terminal;

a pulse width modulator, which pulse width-modulates output of the operational amplifier and outputs a digital signal;

a digital power amplifier, which amplifies power of the digital signal;

a first filter, which smooths output of the digital power amplifier and inputs the smoothed signal to the capacitive load as the driving signal;

a first feedback circuit, which feeds back the driving signal outputted from the first filter to the inverting input terminal of the operational amplifier; and at least one of a second feedback circuit, which feeds back a signal outputted from the digital power amplifier, which signal includes a phase which is advanced relative to the driving signal, to the inverting input terminal of the operational amplifier and a third feedback circuit, which feeds back the driving signal, which has been outputted from the first filter and propagated through wiring resistance between the first filter and the capacitive load, to the inverting input terminal of the operational amplifier.

12. The capacitive load driving circuit of claim 11, wherein both the second feedback circuit and the third feedback circuit are provided, and the first feedback circuit feeds back, to the inverting input terminal of the operational amplifier, a driving signal including a phase which is advanced relative to the driving signal that is fed back by the third feedback circuit.

13. The capacitive load driving circuit of claim 11, wherein the first filter includes an inductor, which is connected to an output terminal of the digital power amplifier, a resistor, which is connected to an output side of the inductor, and a capacitor, one terminal of which is connected to an output side of the resistor and the other terminal of which is connected to ground, a signal outputted from the resistor being inputted to the capacitive load as the driving signal.

14. The capacitive load driving circuit of claim 11, wherein the digital power amplifier includes:

an upper side switching circuit, which includes an upper side voltage amplification circuit for amplifying voltage of the digital signal, an upper side switching element which turns on when the digital signal is at a high level, and an upper side current amplification circuit for amplifying current of the digital signal, the upper side switching circuit performing voltage amplification and current amplification and charging the capacitive load when the upper side switching element is on; and a lower side switching circuit, which includes a lower side voltage amplification circuit for amplifying voltage of the digital signal, a lower side switching element which turns on when the digital signal is at a low level, and a lower side current amplification circuit for amplifying current of the digital signal, the lower side switching circuit performing voltage amplification and current amplification and discharging the capacitive load when the lower side switching element is on.

15. The capacitive load driving circuit of claim 14, wherein a capacitor is provided at an output of the upper side current amplification circuit, the capacitor is connected, via a diode, with a driving power supply which drives the lower side switching circuit, and the upper side voltage amplification circuit is driven by charge which has been charged onto the capacitor.

16. The capacitive load driving circuit of claim 14, wherein the upper side switching element is an N-channel MOSFET and the lower side switching element is an N-channel MOSFET.

17. The capacitive load driving circuit of claim 16, wherein the upper side current amplification circuit further includes a push-pull type upper side buffer circuit, which is connected, via an upper side gate resistor and an upper side second capacitor, with the upper side switching element and which amplifies current of the digital signal, and the lower side current amplification circuit further includes a push-pull type lower side buffer circuit, which is connected, via a lower side gate resistor and a lower side second capacitor, with the lower side switching element and which amplifies current of the digital signal.

18. The capacitive load driving circuit of claim 16, wherein the upper side voltage amplification circuit includes an upper side level-conversion circuit which includes an upper side first MOSFET with a driving power supply via an upper side second resistor, the upper side first MOSFET turning on when the digital signal is at the low level, and the upper side second resistor being connected in parallel with an upper side second MOSFET, which turns on when the digital signal is at the low level, and the lower side voltage amplification circuit includes a lower side level-conversion circuit which includes a lower side first MOSFET with the driving power supply via a lower side second resistor, the lower side first MOSFET turning on when the digital signal is at the high level, and the lower side second resistor being connected in parallel with a lower side second MOSFET, which turns on when the digital signal is at the low level.

19. A droplet ejection device comprising:

a plurality of capacitive load driving circuits; and a droplet ejection head, which includes a capacitive load for causing a droplet to be ejected from a nozzle of the head, wherein each capacitive load driving circuit includes:

an operational amplifier, which outputs a differential signal between a signal which is fed back to an inverting input terminal and an input signal which is inputted to a non-inverting input terminal;

a pulse width modulator, which pulse width-modulates output of the operational amplifier and outputs a digital signal;

a digital power amplifier, which amplifies power of the digital signal;

a first filter, which smooths output of the digital power amplifier and inputs the smoothed signal to the capacitive load as a driving signal;

a first feedback circuit, which feeds back the driving signal outputted from the first filter to the inverting input terminal of the operational amplifier; and at least one of a second feedback circuit, which feeds back a signal outputted from the digital power amplifier, which signal includes a phase which is advanced relative to the driving signal, to the inverting input terminal of the operational amplifier and a third feedback circuit, which feeds back the driving signal, which has been outputted from the first filter and propagated through wiring resistance between the first filter and the capacitive load, to the inverting input terminal of the operational amplifier.

20. A droplet ejection unit comprising:

a droplet ejection element which includes a capacitive load corresponding with a pressure generation chamber which is charged with droplets to be ejected from a nozzle, the droplet ejection element ejecting the droplet from the nozzle when a driving signal is applied to the capacitive load for altering a capacity of the pressure generation chamber; and a capacitive load driving circuit which applies the driving signal to the capacitive load for driving the capacitive load, wherein the capacitive load driving circuit includes:

an operational amplifier, which outputs a differential signal between a signal which is fed back to an inverting input terminal and an input signal which is inputted to a non-inverting input terminal;

a pulse width modulator, which pulse width-modulates output of the operational amplifier and outputs a digital signal;

a digital power amplifier, which amplifies power of the digital signal;

a first filter, which smooths output of the digital power amplifier and inputs the smoothed signal to the capacitive load as the driving signal;

a second feedback circuit, which feeds back a signal outputted from the digital power amplifier, which signal includes a phase which is advanced relative to the driving signal, to the inverting input terminal of the operational amplifier; and a third feedback circuit, which feeds back the driving signal, which has been outputted from the first filter and propagated through wiring resistance between the first filter and the capacitive load to the inverting input terminal of the operational amplifier.

21. A droplet ejection unit comprising:

a droplet ejection element which includes a capacitive load corresponding with a pressure generation chamber which is charged with droplets to be ejected from a nozzle, the droplet ejection element ejecting the droplet from the nozzle when a driving signal is applied to the capacitive load for altering a capacity of the pressure generation chamber; and a capacitive load driving circuit which applies the driving signal to the capacitive load for driving the capacitive load, wherein the capacitive load driving circuit includes:

an operational amplifier, which outputs a differential signal between a signal which is fed back to an inverting input terminal and an input signal which is inputted to a non-inverting input terminal;

a pulse width modulator, which pulse width-modulates output of the operational amplifier and outputs a digital signal;

a digital power amplifier, which amplifies power of the digital signal;

a first filter, which smooths output of the digital power amplifier and inputs the smoothed signal to the capacitive load as a driving signal;

a first feedback circuit, which feeds back the driving signal outputted from the first filter to the inverting input terminal of the operational amplifier; and at least one of a second feedback circuit, which feeds back a signal outputted from the digital power amplifier, which signal includes a phase which is advanced relative to the driving signal, to the inverting input terminal of the operational amplifier and a third feedback circuit, which feeds back the driving signal, which has been outputted from the first filter and propagated through wiring resistance between the first filter and the capacitive load, to the inverting input terminal of the operational amplifier.

22. A driving circuit of an inkjet head which includes a piezoelectric actuator corresponding with a pressure generation chamber which is charged with ink to be ejected from a nozzle, the driving circuit causing an ink droplet to be ejected from the nozzle by applying a driving signal to the piezoelectric actuator for altering a capacity of the pressure generation chamber, and the inkjet head driving circuit comprising:

an operational amplifier, which outputs a differential signal between a signal which is fed back to an inverting input terminal and an analog driving signal which is inputted to a non-inverting input terminal;

a pulse width modulator, which pulse width-modulates output of the operational amplifier and outputs a digital signal;

a digital power amplifier, which amplifies power of the digital signal, a first filter, which smooths output of the digital power amplifier and inputs the smoothed signal to the piezoelectric actuator as the driving signal for causing an ink droplet to be ejected from the nozzle of the inkjet head;

a first feedback circuit, which feeds back the driving signal outputted from the first filter to the inverting input terminal of the operational amplifier; and a second feedback circuit, which includes a second filter for smoothing output of the digital power amplifier and which feeds back a signal smoothed by the second filter to the inverting input terminal of the operational amplifier.

* * * * *